United States Patent
Ahn et al.

(10) Patent No.: US 11,816,385 B2
(45) Date of Patent: Nov. 14, 2023

(54) DISPLAY APPARATUS AND CONTROLLING METHOD THEREOF

(71) Applicant: SAMSUNG ELECTRONICS CO., LTD., Suwon-si (KR)

(72) Inventors: Deukgeun Ahn, Suwon-si (KR); Jaemoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/972,921

(22) Filed: Oct. 25, 2022

(65) Prior Publication Data

US 2023/0221912 A1    Jul. 13, 2023

Related U.S. Application Data

(63) Continuation of application No. PCT/KR2022/008554, filed on Jun. 16, 2022.

(30) Foreign Application Priority Data

Jan. 7, 2022    (KR) .......................... 10-2022-0002691

(51) Int. Cl.
*G06F 3/14*       (2006.01)
*G09G 3/32*       (2016.01)
(Continued)

(52) U.S. Cl.
CPC ............ *G06F 3/1446* (2013.01); *G09G 3/006* (2013.01); *G09G 3/2096* (2013.01); *G09G 3/32* (2013.01);
(Continued)

(58) Field of Classification Search
CPC ..... G06F 3/1446; G06F 3/1423; G09G 3/006; G09G 3/2096; G09G 3/32;
(Continued)

(56) References Cited

U.S. PATENT DOCUMENTS 9,390,646 B2 *   7/2016  Park ...................... G09G 3/2003
9,530,336 B2    12/2016  Safavi et al.
(Continued)

FOREIGN PATENT DOCUMENTS

JP      2021-96389 A    6/2021
KR      10-1350036 B1   1/2014
(Continued)

OTHER PUBLICATIONS

International Search Report and Written Opinion dated Sep. 23, 2022, issued by the International Searching Authority in International Application No. PCT/KR2022/008554 (PCT/ISA/210 and PCT/ISA/237).
(Continued)

*Primary Examiner* — Vijay Shankar

(74) *Attorney, Agent, or Firm* — Sughrue Mion, PLLC

(57) ABSTRACT

A cabinet and a method for controlling a cabinet constituting a modular display apparatus are provided. The cabinet constituting a modular display apparatus includes a plurality of display modules; a first interface; a second interface configured to be connected to a first cabinet adjacent to the cabinet; a memory configured to store at least one test image; and a processor configured to, based on a detection that a test device is connected to the first interface, control the plurality of display modules to display the at least one test image, and control the second interface to transmit the at least one test image to the first cabinet to be displayed on the first cabinet.

18 Claims, 19 Drawing Sheets

(51) Int. Cl.
*G09G 3/20* (2006.01)
*G09G 3/00* (2006.01)

(52) U.S. Cl.
CPC ... *G09G 2300/026* (2013.01); *G09G 2360/04* (2013.01)

(58) Field of Classification Search
CPC ......... G09G 2300/026; G09G 2330/08; G09G 2330/10; G09G 2330/12; G09G 2360/04; G09G 5/14
See application file for complete search history.

(56) References Cited

U.S. PATENT DOCUMENTS

| | | | |
|---|---|---|---|
| 10,121,418 B2* | 11/2018 | Beon | G06F 3/04897 |
| 10,691,395 B2 | 6/2020 | Hyeon | |
| 11,269,578 B2* | 3/2022 | Kim | G06F 1/1601 |
| 11,380,224 B2 | 7/2022 | Jung et al. | |
| 11,409,492 B2* | 8/2022 | Seo | H04N 21/4363 |
| 2014/0152706 A1* | 6/2014 | Park | G09G 3/2003 |
| | | | 345/690 |
| 2016/0133226 A1* | 5/2016 | Park | G06F 3/01 |
| | | | 345/1.3 |
| 2016/0165229 A1 | 6/2016 | Kao et al. | |
| 2021/0286578 A1 | 9/2021 | Seo et al. | |
| 2021/0366331 A1 | 11/2021 | Oh et al. | |

FOREIGN PATENT DOCUMENTS

| | | |
|---|---|---|
| KR | 10-2014-0070120 A | 6/2014 |
| KR | 10-2019-0068123 A | 6/2019 |
| KR | 10-2009658 B1 | 8/2019 |
| KR | 10-2020-0003599 A | 1/2020 |
| KR | 10-2020-0009670 A | 1/2020 |
| KR | 10-2020-0012289 A | 2/2020 |

OTHER PUBLICATIONS

Samsung Electronics LED R&D Lab(VD), "LED Display IWA_IFA installation manual (Ver. 2.3)." Dec. 2, 2021, p. 79.

* cited by examiner

DISPLAY APPARATUS AND CONTROLLING METHOD THEREOF

CROSS-REFERENCE TO RELATED APPLICATION(S)

This application is a bypass continuation of International Application No. PCT/KR2022/008554, filed on Jun. 16, 2022, which is based on and claims priority to Korean Patent Application No. 10-2022-0002691, filed on Jan. 7, 2022, in the Korean Intellectual Property Office, the disclosures of which are incorporated by reference herein in their entireties.

BACKGROUND

1. Field

The disclosure relates to a display apparatus and a method for controlling thereof. More particularly, the display apparatus relates to a cabinet constituting a modular display apparatus and including a plurality of display modules, and a control method thereof.

2. Description of the Related Art

The development of display technology has also diversified screen sizes of display apparatuses. In the past, it was possible only to produce a display apparatus of a limited size, but in recent years, it has become possible to produce a display apparatus with a large screen. Accordingly, the use of display apparatuses with large screens is increasing. Particularly, the use of a modular display apparatus providing an extended display screen by combining a plurality of display modules is increasing. For example, a display apparatus with a large screen corresponds to a digital signage billboard that displays an outdoor advertisement through the display apparatus after being installed in a place with a large floating population, such as a subway station, a bus stop, or the like.

The modular display apparatus can flexibly expand or reduce the size of a display screen according to the number of display modules and their combination, thereby providing convenience to a user using a large display apparatus. Further, the modular display apparatus receives image information related to a specific image from a separate device (e.g., a screen controller, etc.) in order to output a specific image through an entire screen implemented by a plurality of display modules. Particularly, when a specific display module among a plurality of display modules constituting the modular display apparatus receives image information, the specific display module that has received the image information transmits the image information to the other adjacent display modules. Accordingly, all display modules constituting the modular display module receive image information and output the received image information, such that an image is displayed on a screen of a modular display implemented through a plurality of display modules.

However, a connection between a plurality of display modules, particularly between adjacent display modules, should be properly performed in order to transmit/receive image information. When the connection for image information transmission/reception between specific display modules is disrupted or not properly performed, not only transmission/reception of image information between the corresponding display modules may be impossible, but also the transmission/reception of image information between the remaining display modules may be affected. Accordingly, in order for the modular display apparatus implemented through the plurality of display modules to operate, accurate connection between the plurality of display modules is required. However, in order to identify whether the connection between each display module is accurately made, a screen controller, which is a separate device, is required after all the display modules are connected. This is because, after the image information is applied to the display module using the screen controller, it is necessary to observe whether the image is accurately displayed on all display modules. In addition, when it is identified that the connection of a specific display module is disconnected, the connection of the corresponding display module must be attempted by disconnecting all display modules or disassembling the modular display apparatus, which consumes time and money, especially when a new display module is added or replaced with a new display module, an unnecessary process of identifying a connectivity between all display modules must be accompanied.

SUMMARY

The disclosure may solve problems described above, and an aspect of the disclosure is to transmit and receive a test image to and from another adjacent cabinet when a cabinet constituting the modular display apparatus detects connectivity with the test device, and observes the test image displayed from the cabinet and the other cabinet, and identify connectivity between the cabinet and the other cabinet, that is, whether the connection is properly made, and a control method thereof.

However, the problems to be solved by the disclosure are not limited to the problems to be solved, and other problems may exist.

According to an aspect of the disclosure, a cabinet of a modular display apparatus includes: a plurality of display modules; a first interface; a second interface configured to be connected to a first cabinet adjacent to the cabinet; a memory configured to store at least one test image; and a processor configured to, based on a detection that a test device is connected to the first interface, control the plurality of display modules to display the at least one test image, and control the second interface to transmit the at least one test image to the first cabinet to be displayed on the first cabinet.

The processor may be further configured to: based on the detection that the test device is connected to the first interface, control the plurality of display modules to display a first test image among a plurality of test images stored in the memory, and based on receiving, while the first test image is displayed by the plurality of display modules, a command to change an image displayed on the plurality of display modules from the test device, control the plurality of display modules to display a second test image among the plurality of test images, and control the second interface to transmit the second test image to the first cabinet to be displayed on the first cabinet.

The command may be received from the test device based on a button provided on the test device being pressed.

Each of the plurality of display modules may include a plurality of light emitting diodes constituting a plurality of pixels, the plurality of light emitting diodes may include a red light emitting diode, a green light emitting diode, and a blue light emitting diode, the plurality of test images includes a white image, a red image, a green image, and a blue image, and the processor may be further configured to: based on the detection that the test device is connected to the first interface, control the plurality of display modules to display the white image, and based on the command to change of the image displayed on the plurality of display modules being received a plurality of times from the test device, control the plurality of display modules to sequentially display the red image, the green image, and the blue image.

The cabinet may further include a third interface connected to a second cabinet adjacent to the cabinet, and the processor may be further configured to, based on receiving the test image from the second cabinet through the third interface, display the received test image, and control the second interface to transmit the received test image to the first cabinet.

The received test image may be transmitted by the second cabinet based on the test device being disconnected from the cabinet and connected to the second cabinet.

The processor may be further configured to, based on receiving the test image from the first cabinet through the second interface, control the plurality of display modules to display the received test image, and control the third interface to transmit the received test image to the second cabinet to be displayed on the first cabinet.

The processor may be further configured to control the second interface to transmit the at least one test image to the first cabinet through the second interface further based on the first cabinet being normally connected to the second interface.

According to an aspect of the disclosure, a method for controlling a cabinet of a modular display apparatus includes: detecting that a test device is connected to a first interface of the cabinet; controlling a plurality of display modules of the cabinet to display at least one test image stored in a memory of the cabinet; and transmitting, through a second interface of the cabinet, the at least one test image to a first cabinet to be displayed on the first cabinet.

The method may further include: based on the detecting that the test device is connected to the first interface, controlling the plurality of display modules to display a first test image among a plurality of test images stored in the memory; while the first test image is displayed, receiving a command to change an image displayed on the plurality of display modules from the test device; based on receiving the command, controlling the plurality of display modules to display a second test image among the plurality of test images; and transmitting, through the second interface, the second test image to the first cabinet to be displayed on the first cabinet.

The command is received from the test device based on a button provided on the test device being pressed.

The method may further include: wherein each of the plurality of display modules may include a plurality of light emitting diodes constituting a plurality of pixels, wherein the plurality of light emitting diodes may include a red light emitting diode, a green light emitting diode, and a blue light emitting diode, wherein the plurality of test images stored in the memory may include a white image, a red image, a green image, and a blue image, based on the detecting that the test device is connected to the first interface, controlling the plurality of display modules to display the white image; and based on the command to change of the image displayed on the plurality of display modules being received a plurality of times from the test device, controlling the plurality of display modules to sequentially display the red image, the green image, and the blue image.

The method may further include: receiving, through a third interface of the cabinet, the test image from a second cabinet adjacent to the cabinet; controlling the plurality of display modules to display the received test image; and transmitting the received test image to the first cabinet through the second interface.

The received test image may be transmitted by the second cabinet based on the test device being disconnected from the cabinet and connected to the second cabinet.

The method may further include: receiving the test image from the first cabinet through the second interface; controlling the plurality of display modules to display the received test image; and transmitting, through the third interface, the received test image to the second cabinet to be displayed on the first cabinet.

The transmitting the at least one test image may include transmitting the at least one test image to the first cabinet through the second interface based on the first cabinet being normally connected to the second interface.

According to various embodiments of the disclosure, a connectivity of all display modules constituting a modular display apparatus may be identified without a separate screen controller by identifying the connectivity whenever connectivity between adjacent display modules is made.

Aspects of the disclosure are not limited to the aspects described above, and other aspects not described will be clearly understood by those skilled in the art from the following description.

DETAILED DESCRIPTION

Hereinafter, embodiments of the disclosure will be described in detail with reference to the accompanying drawings.

Terms used in the disclosure are selected as general terminologies currently widely used in consideration of configurations and functions of the one or more embodiments of the disclosure, but can be different depending on intention of those skilled in the art, a precedent, appearance of new technologies, or the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall context of the disclosure.

In the disclosure, the terms "include", "may include", "comprise" or "may comprise" designate the presence of features, numbers, steps, operations, components, elements, or a combination thereof that are written in the specification, but do not exclude the presence or possibility of addition of one or more other features, numbers, steps, operations, components, elements, or a combination thereof.

The term "at least one of A or/and B" means including at least one A, including at least one B, or including both at least one A and at least one B.

The expression "1", "2", "first", or "second" as used herein may modify a variety of elements, irrespective of order and/or importance thereof, and only to distinguish one element from another.

When an element (e.g., a first element) is "operatively or communicatively coupled with/to" or "connected to" another element (e.g., a second element), an element may be directly coupled with another element or may be coupled through the other element (e.g., a third element).

Singular forms are intended to include plural forms unless the context clearly indicates otherwise. In the disclosure, the terms "include" and "comprise" designate the presence of features, numbers, steps, operations, components, elements, or a combination thereof that are written in the disclosure, but do not exclude the presence or possibility of addition of one or more other features, numbers, steps, operations, components, elements, or a combination thereof.

In the disclosure, a 'module' or a 'unit' performs at least one function or operation and may be implemented by hardware or software or a combination of the hardware and the software. In addition, a plurality of 'modules' or a plurality of 'units' may be integrated into at least one module and may be at least one processor except for 'modules' or 'units' that should be realized in a specific hardware.

Figure 1:
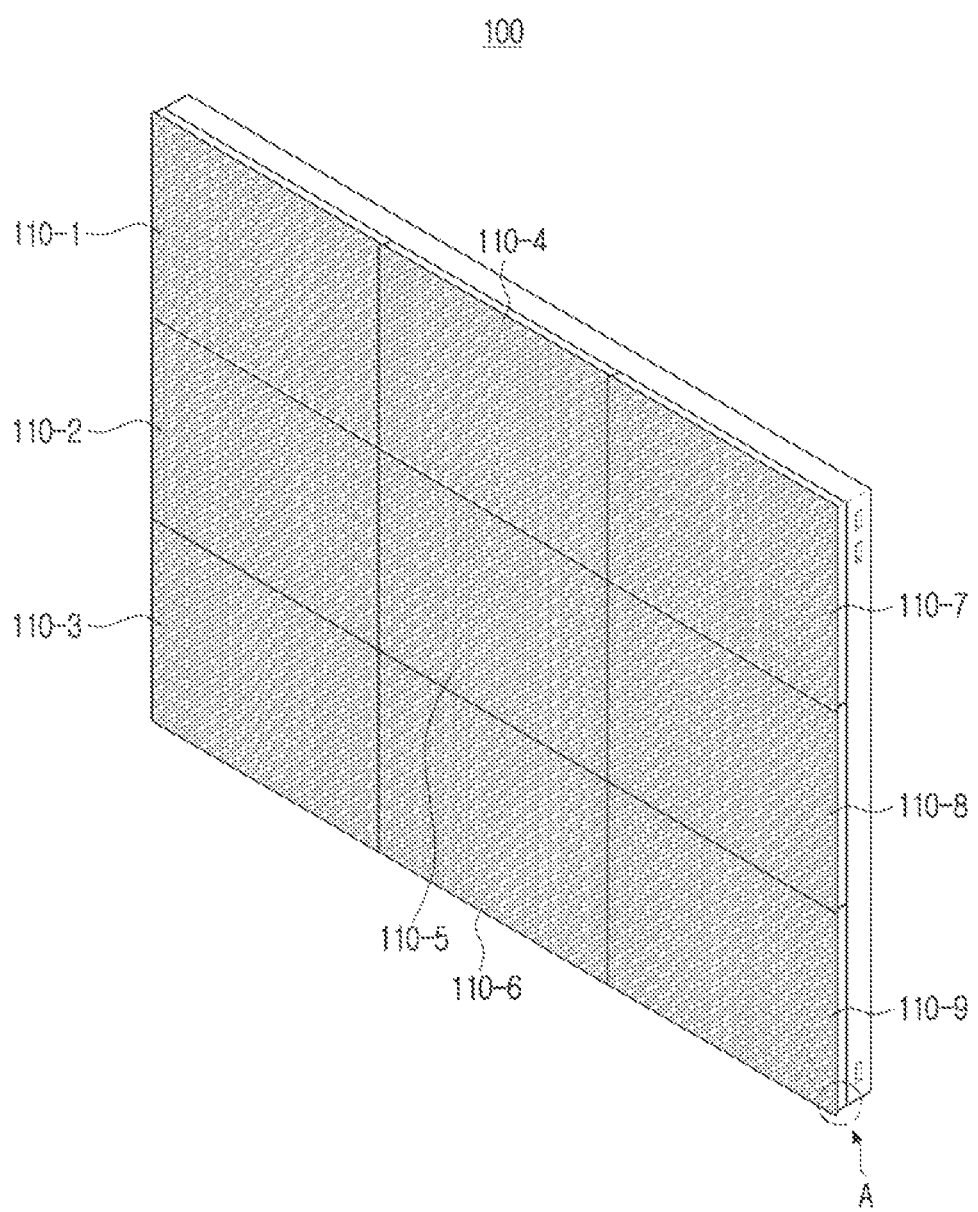
FIG. 1 is a view illustrating a cabinet constituting a modular display apparatus according to an embodiment.

FIG. 1 is a view illustrating a cabinet constituting a modular display apparatus according to an embodiment;

A cabinet 100 constituting a modular display apparatus 1000 according to an embodiment includes a plurality of display modules 110. For example, referring to FIG. 1, the cabinet 100 may include nine display modules (hereinafter referred to as 110-1 to 110-9).

According to an embodiment, the plurality of display modules 110 included in the cabinet 100 may be arranged in a matrix form. For example, referring to FIG. 1, nine display modules 110-1 to 110-9 may be arranged in a 3×3 matrix form and configure the cabinet 100. Although not clearly shown in the drawing, each of the display modules 110-1 to 110-9 included in the cabinet 100 may be physically connected. The plurality of display modules 110 arranged in the 3×3 matrix form may correspond to an example according to the disclosure, and the arrangement form of the display module 110 and a number of the display modules 110 included in the cabinet 100 may be variously changed.

In addition, the cabinet 100 may include a base plate on which each of the display modules 110-1 to 110-9 may be mounted. The base plate may be implemented in a form in which each display module 110 is mounted on a front surface of the base plate.

In addition, the cabinet 100 according to an embodiment of the disclosure may include a plurality of connecting parts capable of being combined with the other cabinets. Accordingly, the plurality of cabinets 100 may be arranged adjacent to each other to configure a screen of the modular display apparatus 1000. Also, the cabinet 100 may include a driving circuit, a backlight unit, or the like.

Figure 2:
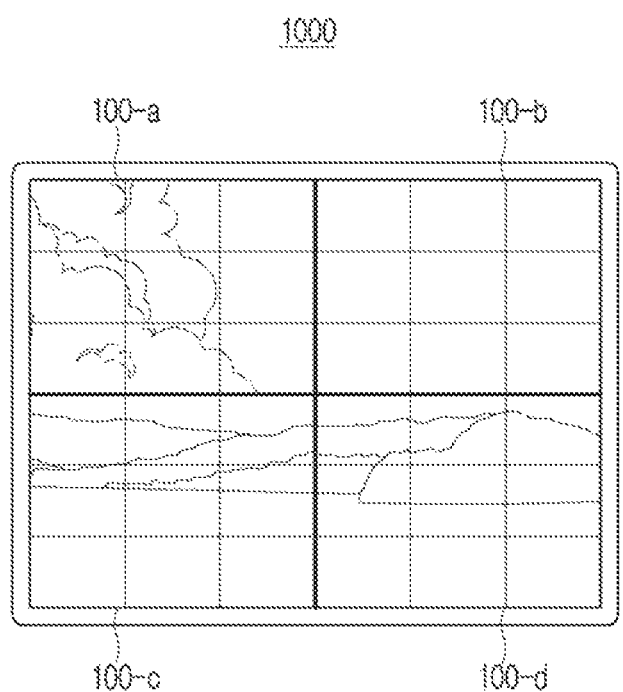
FIG. 2 is a view illustrating a modular display apparatus implemented with a plurality of cabinets according to an embodiment.

FIG. 2 is a view illustrating a modular display apparatus implemented with a plurality of cabinets according to an embodiment.

According to an embodiment of the disclosure, the modular display apparatus 1000 may include a plurality of cabinets 100. The modular display apparatus 1000 may be implemented as a single large display apparatus, such as a digital signage, an electronic display, etc., in which the plurality of cabinets 100 including the plurality of display modules 110 are combined or assembled, or it may be implemented as a single small display apparatus such as a monitor for a personal computer (PC), a TV, or the like. However, the disclosure is not limited thereto.

The plurality of cabinets 100 may be arranged in a matrix form and constitute one modular display apparatus 1000. For example, referring to FIG. 1, four cabinets 100-a, 100-b, 100-c, and 100-d may be arranged in a 2×2 matrix form and implement the modular display apparatus 1000.

The modular display apparatus 1000 may output an image through the plurality of cabinets 100 constituting the modular display apparatus 1000. Specifically, when each cabinet 100 is combined according to a predetermined arrangement, the modular display apparatus 1000 may output a specific image through an entire screen implemented by combining display panels of the plurality of display modules 110 included in each cabinet 100. A portion of the specific image may be output by each cabinet 100.

For example, referring to FIG. 2, an upper left cabinet 100-a may display an upper left area of the specific image, a lower left cabinet 100-*c* may display a lower left area of the specific image, an upper right cabinet 100-*b* may display an upper right area of the image, and a lower right cabinet 100-*d* may display a lower right area of the image. In other words, each of the cabinets 100-*a*, 100-*b*, 100-*c* and 100-*d* may display an image of one area of the entire image corresponding to a position of each cabinet in the modular display apparatus 1000.

The modular display apparatus 1000 may have different sizes or different resolutions by combining various number of cabinets 100. In addition, in order to implement the modular display apparatus 1000, the plurality of cabinets 100 may be arranged in various matrix forms other than the 2×2 matrix form shown in FIG. 2. In other words, according to an embodiment of the disclosure, the plurality of cabinets may be arranged in a matrix of M×N (M and N are natural numbers equal to or greater than 1).

The modular display apparatus 1000 may receive image information about an image output through a screen implemented with a plurality of cabinets 100 (or an entire screen in which display panels of a plurality of display modules included in the plurality of cabinets are combined) from a screen controller 600. More specifically, at least one of the plurality of cabinets 100 constituting the modular display apparatus 1000 may receive image information from the screen controller 600. In addition, at least one cabinet that has received the image information may transmit the received image information to the other adjacent cabinet. As such, since the cabinet receiving the image information transmits the image information to the other adjacent cabinet, all cabinets constituting the modular display apparatus 1000 may share the image information.

Thus, a connection between the plurality of cabinets 100, particularly, between the plurality of cabinets arranged adjacently should be properly performed in order to transmit/receive image information. When the connection for transmitting/receiving image information between specific cabinets is cut off or not properly performed, it may be impossible to transmit/receive image information between the corresponding cabinets, and consequently, a transmission/reception of image information between the remaining cabinets may also be affected. Therefore, prior to controlling the modular display apparatus 1000, a process of identifying whether a connection for transmitting and receiving image information between each cabinet 100 constituting the modular display apparatus 1000 is accurately performed should be accompanied.

In the related art, it was identified whether a connection between cabinets 100 (or the display modules 110) is accurately performed by observing an image output from the entire cabinet 100 (or the entire display module 110) after controlling the entire cabinet 100 (or the entire display module 110) in order to output the image after a connection between the plurality of cabinets 100 (or the plurality of display modules 110) constituting the modular display apparatus 1000. In other words, by identifying a cabinet 100 (or a display module 110) in which an image is not output or the output image is abnormal, a connection between the corresponding cabinet 100 (or the display module 110) and the other cabinet 100 adjacent to the corresponding cabinet 100 (or display module 110) was repaired.

However, for this operation, an unnecessary process of releasing a coupling of the other cabinet (or other display module), which has already been connected normally, is required, and also whenever a new cabinet (display module) is added or replaced, the unnecessary process described above should be repeated. In order to solve the problem, according to the disclosure, a connection relationship between cabinets 100 is identified in a process of implementing the modular display apparatus 1000.

In other words, prior to the connection of all cabinets constituting the modular display apparatus 1000 is completed, whenever each cabinet 100 is connected, it is identified whether the connection with the other adjacent cabinets is accurately performed. Accordingly, the above-described unnecessary process is not required, and furthermore, it may increase an accuracy in identifying the connectivity between cabinets. Hereinafter, an embodiment of the disclosure related thereto will be described in detail.

Figure 3:
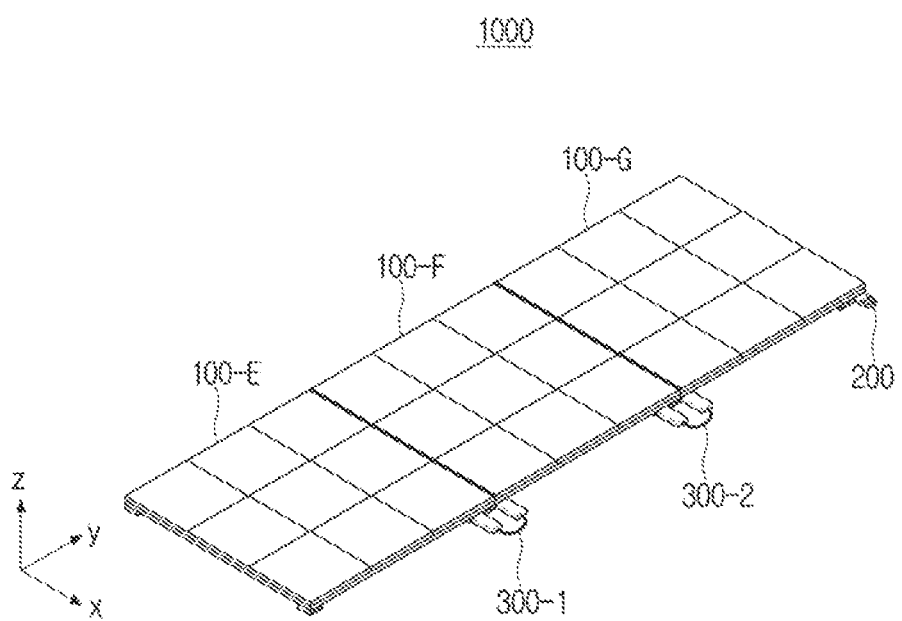
FIG. 3 is a view illustrating a method for checking connectivity between adjacent cabinets according to an embodiment.

FIG. 3 is a view illustrating a method for checking connectivity between adjacent cabinets according to an embodiment.

Referring to FIG. 3, three cabinets 100-E, 100-F, and 100-G constituting the modular display apparatus 1000 are arranged on an x-y plane. Each cabinet 100 is connected to an adjacent cabinet for transmitting and receiving image information. Specifically, a cabinet 100-E arranged on a lower side and a cabinet 100-F arranged in a center may be connected through a first cable 300-1, and the cabinet 100-F arranged in the center and a cabinet 100-G arranged at an upper side may be connected through a second cable 300-2. However, the disclosure is not limited thereto, and the cabinet 100 may transmit/receive image information using various communication methods through a communicator other than the cables (the first cable and the second cable).

According to an embodiment of the disclosure, in order to identify whether the connection between the three cabinets 100 arranged on the x-y plane is accurately performed, the cabinet 100-F arranged in the center may receive a test image for identifying connectivity with the other cabinet 100-G that is combined by being arranged on the upper side of the cabinet 100-F. Specifically, when a test device 200 for verifying the connectivity between the plurality of cabinets 100 is connected to the cabinet 100-G arranged on the upper side, the cabinet 100-F arranged in the center may receive a test image from the cabinet 100-G arranged on the upper side, which is connected to the test device 200. Also, the cabinet 100-F arranged in the center may display the received test image and then transmit the received test image to the cabinet 100-E arranged on the lower side and combined.

When the connection between the cabinet 100-F arranged in the center and the cabinet 100-G arranged in the upper side is not performed or inaccurately performed, the cabinet 100-F arranged in the center may not receive the test image from the cabinet 100-G arranged in the upper side. In addition, the cabinet 100-E arranged on the lower side may also not receive a test image of the cabinet 100-G arranged on the upper side from the cabinet 100-F arranged in the center. As a result, the test image for identifying the connectivity may be displayed only on the cabinet 100-G arranged on the upper side. The user may identify that the cabinet 100-G arranged on the upper side and the cabinet 100-F arranged in the center are not properly connected. Accordingly, the user may quickly change the connection between the plurality of cabinets in which the connection is inaccurately performed.

According to an embodiment of the disclosure, each of the cabinets 100-E, 100-F, and 100-G may transmit/receive, through the cables 300-1 and 300-2, various information such as coordinate information corresponding to a position in which each cabinet is arranged, ID information corresponding to each cabinet in addition to the image information.

Figure 4:
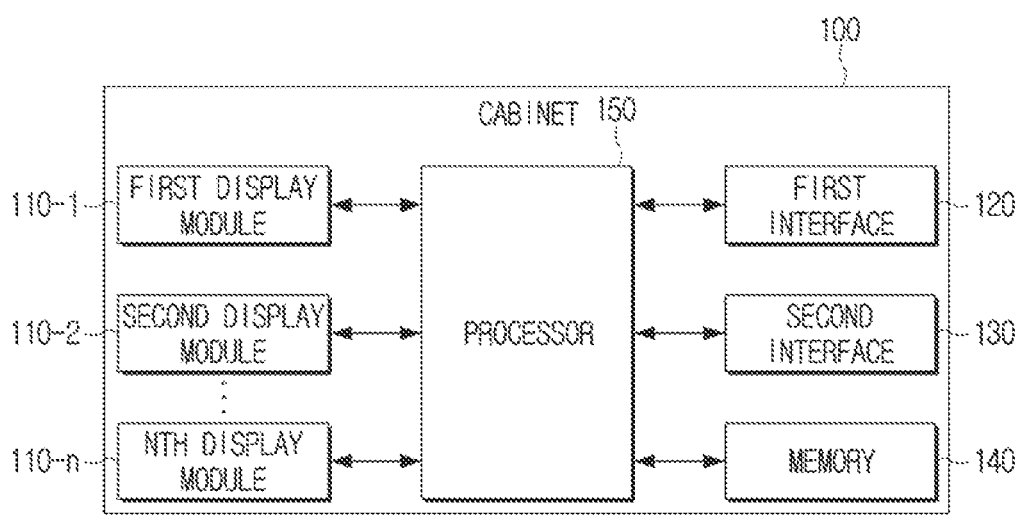
FIG. 4 is a block diagram illustrating a configuration of a cabinet according to an embodiment.

FIG. 4 is a block diagram illustrating a configuration of a cabinet according to an embodiment.

Referring to FIG. 4, the cabinet 100 includes a plurality of display modules 110, a first interface 120, a second interface 130, a memory 140, and a processor 150.

According to an embodiment of the disclosure, the plurality of display modules 110 may output an image through a display panel included in each display module 110. For this operation, each display module 110-1, 110-2, 110-n, and n are natural numbers greater than or equal to 2), may be implemented as an LED display module including a plurality of light emitting diodes (LEDs). Specifically, the display modules 110-1, 110-2, . . . , 110-n, hereinafter referred to as 100) may include a plurality of light emitting diodes constituting a plurality of pixels. The plurality of light emitting diodes may be arranged in a matrix form (e.g., 1×m, where 1 and m are natural numbers) and implement a plurality of pixels.

The light emitting diode of the display module 110 according to an embodiment may be implemented as a micro LED. Herein, the micro-LED may be an LED having a size of about 5 to 100 micrometers, and may refer to a micro-light emitting diode that emits light without a color filter. An LED display module is only an embodiment, and the display module may be implemented as a liquid crystal panel (LCD), an organic LED (OLED), an active-matrix OLED (AMOLED) panel, a plasma display panel (PDP), or the like. Hereinafter, for convenience of description, it is assumed that the display module according to an embodiment is an LED display module.

Not only each cabinet 100 constituting the modular display apparatus 1000 but also a plurality of display modules 110 included in the same cabinet, images displayed by each display module may be different. Specifically, referring back to FIG. 2, nine display modules included in the upper left cabinet 100-a of the modular display apparatus 1000 may display an image by dividing the image corresponding to the upper left area of the specific image, allocated to the upper left cabinet 100-a of the specific image. In other words, each display module 110 may output a portion corresponding to a position at which each display module 110 is arranged among a portion of the entire image set to be output to the cabinet 100 or allocated to the cabinet 100.

Referring back to FIG. 4, according to an embodiment of the disclosure, the cabinet 100 may include a first interface 120. The cabinet may be connected to the test device 200 through the first interface 120.

Also, according to an embodiment of the disclosure, the cabinet 100 may include the second interface 130. The cabinet 100 may be connected to the other adjacent cabinet through the second interface 130. In addition, the cabinet 100 may transmit and receive various information (e.g., image information, coordinate information, ID information, etc.) with one other adjacent cabinet connected to the cabinet through a cable connected to the second interface 130.

Referring to FIG. 4, although the first interface 120 and the second interface 130 are illustrated as separate elements, the first interface 120 and the second interface 130 may be implemented by being separated as at least one pin corresponding to each interface (the first interface and the second interface) within one interface including a plurality of pins. At least one pin implementing the first interface 120 and at least one pin implementing the second interface 130 may be included in a separated area so as not to overlap with each other, and may be implemented as respective interfaces.

The first interface 120 and the second interface 130 may be implemented as an RF terminal, a component output terminal, a composite output terminal, an optical output terminal, an HDMI output terminal, a D-SUB output port, a DVI output terminal, or the like.

Referring back to FIG. 4, according to an embodiment of the disclosure, the cabinet 100 may include a memory 140. The memory 140 may store the cabinet 100 and an operating system (O/S) for driving the plurality of display modules 110 included in the cabinet 100.

In addition, according to various embodiments of the disclosure, a software program and an application for operating the display module 110 may be stored in the memory 140, and various information such as various data input, set or generated during execution of programs or applications may be stored. For example, information about a test image for identifying connectivity between the cabinet 100 and the other adjacent cabinet connected through the second interface 130 may be stored in the memory 140.

According to an embodiment of the disclosure, the cabinet 100 includes the processor 150. The processor 150 controls the overall operations of the cabinet 100. Specifically, the processor 150 may be connected to each component of the cabinet 100 to control the components of the cabinet 100.

According to an embodiment, the processor 150 may be named variously such as a digital signal processor (DSP), a microprocessor, a central processing unit (CPU), a micro controller unit (MCU), and a micro processing unit (MPU), a Neural Processing Unit (NPU), a controller, an application processor (AP), and a timing controller (TCON), but is described as the processor 150 in the disclosure.

In addition, the processor 150 may be implemented as a system on chip (SoC) or large scale integration (LSI), or may be implemented in a field programmable gate array (FPGA) form. In addition, the processor 150 may include a volatile memory such as SRAM.

Hereinafter, a cabinet capable of identifying whether a cabinet and an adjacent cabinet are properly connected and a control method thereof according to an embodiment of the disclosure will be described in detail with reference to FIGS. 5 to 18.

Figure 5:
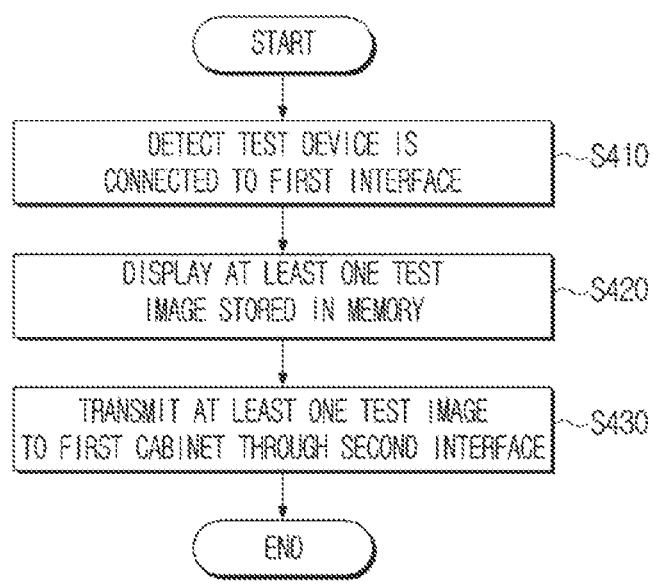
FIG. 5 is a flowchart schematically illustrating a method for controlling a cabinet according to an embodiment.
Figure 6:
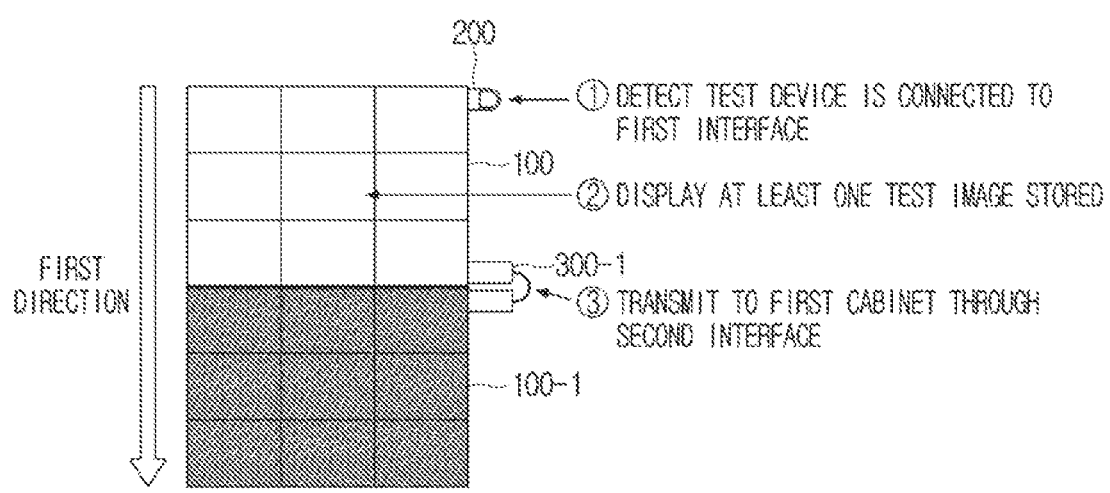
FIG. 6 is an example diagram schematically illustrating a method for checking connectivity between a cabinet and the other cabinet connected adjacently according to an embodiment.

FIG. 5 is a flowchart schematically illustrating a method for controlling a cabinet according to an embodiment, and FIG. 6 is an example diagram schematically illustrating a method for checking connectivity between a cabinet and the other cabinet connected adjacently according to an embodiment.

Referring to FIG. 5, according to an embodiment of the disclosure, the processor 150 of the cabinet 100 detects that the test device 200 is connected to the first interface 120 (S410). The processor 150 controls the plurality of display modules 110 included in the cabinet to display at least one test image stored in the memory 140 (S420).

Specifically, referring to FIG. 6, when the cabinet 100 and the test device 200 are connected through the first interface 120, the processor 150 may receive a test image output signal from the test device 200 through the first interface 120. In response to the image output signal, the processor 150 may extract at least one test image stored in the memory 140, and control the plurality of display modules 110 such that the extracted test image is displayed on the plurality of display modules 110 included in the cabinet 100.

As described above, when implementing the cabinet 100, the plurality of display modules 110 may display an area of a test image corresponding to a position where each display module 110 is arranged. In this regard, this has been described above, such that it will be omitted.

The processor 150 may transmit at least one test image displayed through the plurality of display modules 110 to a first cabinet 100-1 through the second interface 130 (S430).

In the disclosure, the first cabinet 100-1 refers to the other cabinet arranged adjacent to the cabinet 100 and the cabinet connected through the second interface 130. More specifically, the first cabinet 100-1 refers to a cabinet that is arranged in a first direction with respect to the cabinet 100 and is connected to the cabinet 100 through the second interface 130 using a cable 300, etc.

In the disclosure, the first direction refers to one direction in which image information is transmitted between the plurality of cabinets 100. Referring back to FIG. 3, when the cabinet 100-G arranged on the upper side of the three cabinets receives image information from an external device, assuming that the received image information is transmitted to the cabinet 100-F arranged in the center, and the cabinet 100-F arranged in the center transmits image information received from the cabinet 100-G arranged on the upper side to the cabinet 100-E arranged on the lower side, the first direction corresponds to a (−) direction of an y-axis. In this case, the first cabinet 100-1 is the cabinet 100-E arranged on the lower side with respect to the cabinet 100-F arranged in the center.

In order to implement the modular display apparatus 1000, assuming that the plurality of cabinets 100 are sequentially included in the modular display apparatus 1000 and then combined with the cabinets included in the previous order, the first cabinet 100-1 may refer to a cabinet of the previous order of the cabinet 100. For example, referring back to FIG. 3, it is assumed that three cabinets 100-E, 100-F, and 100-G are sequentially combined to implement the modular display apparatus 1000. In this case, assuming that the cabinet 100-E arranged on the lower side is arranged, the cabinet 100-F arranged in the center is arranged and combined with the cabinet 100-E arranged on the lower side, and then the cabinet 100-G arranged on the upper side is arranged and combined with the cabinet 100-F arranged in the center, with respect to the cabinet arranged on the upper side (third cabinet) 100-G, the first cabinet 100-1 may be the centrally positioned cabinet (second cabinet) 100-F disposed in the modular display apparatus 1000 in the previous order.

The first cabinet 100-1 may be relatively determined with respect to each cabinet 100 constituting the modular display apparatus 1000. Referring back to the above example, the first cabinet 100-1 with respect to the cabinet 100-F arranged in the center is a cabinet arranged in−y-axis, that is the first direction, and connected to the cabinet 100-F arranged in the center. In other words, the first cabinet 100-1 with respect to the cabinet 100-F arranged in the center is the cabinet 100-E arranged on the lower side. However, the first cabinet 100-1 with respect to the cabinet 100-G arranged on the upper side may be a cabinet arranged in the−y-axis, that is the first direction, and connected to the cabinet 100-G arranged on the upper side. In other words, the first cabinet 100-1 with respect to the cabinet 100-G arranged on the upper side is the cabinet 100-F arranged in the center.

Referring back to FIG. 6, the processor 150 may transmit the test image to the first cabinet 100-1 through the second interface 130. In this case, at least one test image displayed on the cabinet 100 may be displayed on the first cabinet 100-1 that has received the at least one test image through the second interface 130.

In this case, according to an embodiment of the disclosure, the at least one test image may be transmitted to the first cabinet 100-1 through the second interface 130 as the first cabinet 100-1 and the cabinet 100 are normally connected through the second interface 130.

Specifically, according to an embodiment of the disclosure, the test image transmitted through the second interface 130 may be the same as the test image displayed on the plurality of display modules 110 of the cabinet 100. For example, after the processor 150 detects the connection between the cabinet 100 and the test device 200 through the first interface 120, if the display module 110 is controlled to display a test image A among the plurality of test images, the processor 150 may transmit the displayed test image A to the first cabinet 100-1 through the second interface 130. In this case, the processor 150 may transmit the test image A to the first cabinet 100-1 only when the connection between the cabinet 100 and the first cabinet 100-1 is normally performed through the second interface 130. Accordingly, the user may observe whether the same test image A is output from the cabinet 100 and the first cabinet 100-1 connected to the test device 200, and when the test image A is not output to the first cabinet, the user may identify that the connection between the cabinet 100 and the first cabinet 100-1 is abnormally performed.

According to another embodiment of the disclosure, the processor 150 may transmit, to the first cabinet 100-1, a signal requesting to display a test image stored in the memory of the first cabinet 100-1 instead of the test image, through the second interface 130. In this case, the signal may be transmitted to the first cabinet 100-1 through the second interface 130 as the first cabinet 100-1 and the cabinet 100 are normally connected through the second interface 130.

The test image displayed on the cabinet 100 may be changed. For example, even though the cabinet 100 and the first cabinet 100-1 are accurately connected, a transmission of the test image to the first cabinet 100-1 may be delayed for a predetermined time, or an output of the test image from the first cabinet 100-1 may be delayed due to various reasons such as external signal interference, buffer time required in the first cabinet 100-1 to switch from standby mode to turn-on mode, or the like. Accordingly, the processor 150 displays a plurality of test images and transmits the plurality of test images to the first cabinet 100-1 such that the user observes whether the plurality of test images are output and the processor 150 makes the user to more accurately identify the connectivity between the cabinets 100. Hereinafter, an embodiment of the disclosure related thereto will be described.

Figure 7:
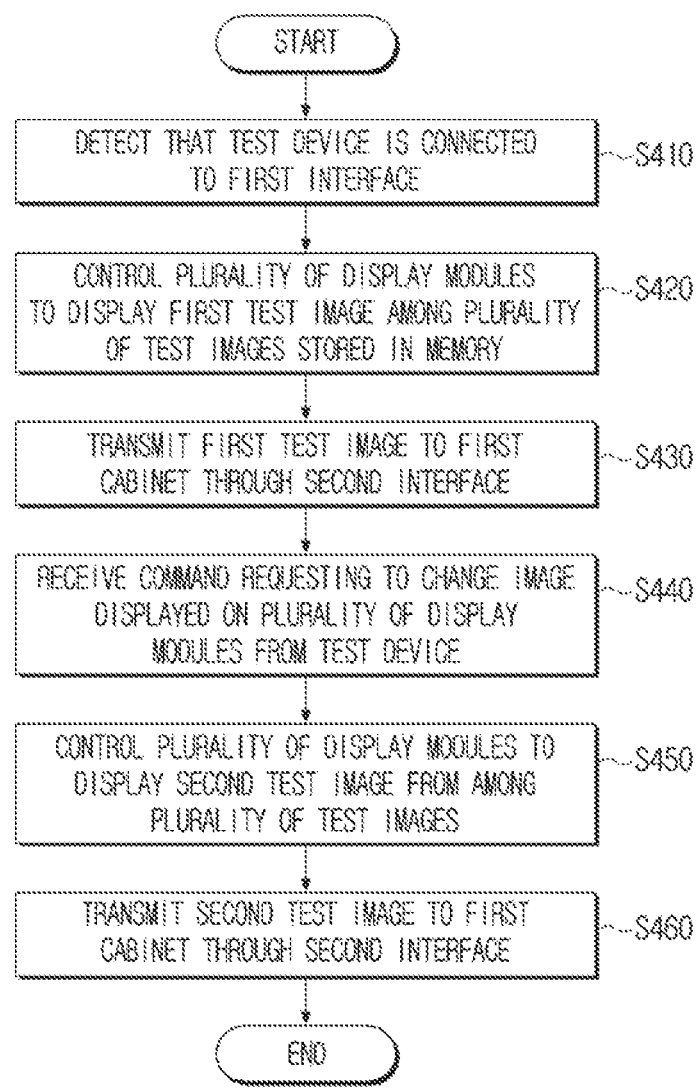
FIG. 7 is a flowchart schematically illustrating a method for changing a test image displayed on a cabinet according to an embodiment.

FIG. 7 is a flowchart schematically illustrating a method for changing a test image displayed on a cabinet according to an embodiment.

Referring to FIG. 7, according to an embodiment of the disclosure, when it is detected that the test device 200 is connected to the first interface 120, the processor 150 controls the plurality of display modules 110 to display a first test image among the plurality of test images stored in the memory (S421).

When the processor 150 detects a connection between the cabinet 100 and the test device 200 through the first interface 120, the first test image refers to a test image set to be displayed first among the plurality of test images stored in the memory 140. The plurality of test images may be stored in the memory 140. In this case, the plurality of test images may be stored in the memory 140 with a preset order in which they are displayed on the cabinet 100.

In this case, when the processor 150 detects a connection between the cabinet 100 and the test device 200 through the first interface, the processor 150 may control the plurality of display modules 110 included in the cabinet 100 to display the first test image for the first time among the plurality of test images. Accordingly, even when the test device 200 is disconnected from the cabinet 100 and then connected again through the first interface 120, the processor 150 may extract the first test image among the plurality of test images stored in the memory 140 and output the first test image through the plurality of display modules 110.

After the cabinet 100 and the test device 200 are connected, the image displayed through the plurality of display modules 110 of the cabinet 100 is a test image other than the preset first test image, or the first test image is not displayed, the user may identify that the connection between the cabinet 100 and the test device 200 is abnormally performed.

Referring back to FIG. 7, according to an embodiment of the disclosure, while the first test image is displayed, the processor 150 may receive a command requesting to change the image displayed on the plurality of display modules 110 from the test device 200 (S440).

Specifically, the processor 150 may control the plurality of display modules to display the first test image (S421), and then transmit the first test image to the first cabinet through the second interface 130 (S431). Also, while the first test image is displayed, the processor 150 may receive a command for requesting a change of the test image or a signal corresponding thereto from the test device 200 through the first interface 120. In other words, as the cabinet 100 and the test device 200 are connected through the first interface 120, the processor 150 may receive a signal corresponding to the command for requesting the change of the test image in addition to the test image output signal received from the test device 200.

According to an embodiment of the disclosure, upon receiving the command requesting a change of the displayed test image or signal corresponding thereto from the test device 200, the processor 150 may control the plurality of display modules 110 to display a second test image from among the plurality of test images (S450).

The second test image refers to a test image set to be displayed after the first test image.

Specifically, when the processor 150 receives a command for requesting a change of the test image from the test device 200 while the first test image is displayed (S440), the processor may extract, from the memory 140, the second test image whose sequence is set to be displayed after the first test image. In addition, the processor 150 controls the plurality of display modules 110 to change the first test image displayed on the plurality of display modules 110 into the second test image.

Information about the second test image may be further included in the test image change command which the processor 150 receives from the test device 200 or signal corresponding thereto. Even if a display order of the plurality of test images stored in the memory 140 is not set, the processor 150 may change the image displayed through the plurality of display modules 110 from the first test image to the second test image based on the information on the second test image included in the received test image change command.

According to an embodiment of the disclosure, the processor 150 may display the second test image (S450) and then transmit the second test image to the first cabinet 100-1 through the second interface 130 (S460).

The first cabinet 100-1 may receive second test image information from the cabinet 100 through the second interface 130 while displaying the first test image received from the cabinet. Accordingly, the first cabinet 100-1 may change the first test image displayed through the plurality of display modules included in the first cabinet 100-1 to the second test image. In other words, if the processor 150 of the cabinet 100 changes the test image from the first test image to the second test image based on a command for requesting a change of the test image received from the test device 200, the processor 150-1 of the first cabinet may change the test image from the first test image to the second test image based on receiving information about the second test image, which is a new test image, from the cabinet 100.

In this case, according to an embodiment of the disclosure, the second test image may be transmitted to the first cabinet 100-1 through the second interface 130 as the first cabinet 100-1 and the cabinet 100 are normally connected through the second interface 130. Accordingly, when the second test image is not displayed on the first cabinet 100-1 after the first test image is normally displayed on the first cabinet 100-1, the user may identify that the normal connection state of the cabinet 100 and the first cabinet 100-1 is changed to an abnormal connection state thereafter.

According to an embodiment of the disclosure, while the second test image is displayed, the processor 150 may receive a command requesting a change of the test image or a signal corresponding thereto from the test device 200. Accordingly, the processor 150 may control the plurality of display modules 110 to display a third test image of the next order set to be displayed on the cabinet 100 after the second test image. Also, after the third test image is displayed, the processor 150 may transmit the third test image to the first cabinet 100-1 through the second interface 130. In other words, a process of changing the test image displayed on the plurality of display modules 110 included in each cabinet may be repeated based on the command for requesting the change of the test image received from the above-described test device 200.

According to an embodiment of the disclosure, the processor 150 may transmit a signal requesting to change the test image to the first cabinet through the second interface. The processor 150 may transmit, to the first cabinet 100-1, a signal requesting to change the test image displayed on the plurality of display modules of the first cabinet 100-1 instead of the second test image, through the second interface. In addition, the first cabinet 100-1 receiving the signal requesting the change of the test image may change the test image displayed on the plurality of displays from the first test image to the second test image. According to an embodiment of the disclosure, the same plurality of test images may be stored in the memory of each cabinet, and the display order of the plurality of test images may also be set identically for the plurality of cabinets.

According to an embodiment of the disclosure, the processor 150 may receive the command requesting a change of the test image received from the test device 200 from the test device 200 as a button provided on the test device 200 is pressed.

Figure 8:
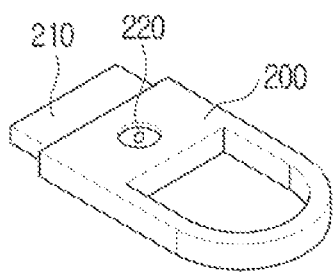
FIG. 8 is an example diagram of a test device according to an embodiment.

FIG. 8 is an example diagram of a test device according to an embodiment.

Referring to FIG. 8, according to an embodiment of the disclosure, the test device 200 may include an output unit 210 including a connection terminal enabling connection to the cabinet 100 through the first interface 120. For example, when the first interface 120 is implemented with a plurality of pins, the output unit 210 of the test device 200 may be implemented as a receptacle including a plurality of holes that can be inserted into the plurality of pins. However, the disclosure is not limited thereto, the output unit 210 and the second interface 130 may be implemented as an RF terminal, a component output terminal, a composite output terminal, an optical output terminal, an HDMI output terminal, a D-SUB output port, a DVI output terminal, or the like.

In addition, the test device 200 may further include an interface 220 for outputting a command requesting a change of the test image or a signal corresponding thereto to the cabinet through the output unit 210. In this case, the interface 220 may be implemented as a button. As the button provided in the test device 200 is pressed, the test device 200 may output the command requesting a change of the test image or a signal corresponding thereto through the output unit 210.

In other words, when the processor 150 of the cabinet 100 detects a connection between the cabinet 100 and the test device 200 through the first interface 120, the processor 150 may control the plurality of display modules 110 to display a first test image, receive the command for requesting a change of the test image from the test device 200 as the button provided on the test device 200 is pressed while the first test image is displayed, and, accordingly change the test image from the first test image to the second test image. While the second test image is displayed, when receiving the command requesting to change the test image again from the test device 200 as the button provided on the test device 200 is pressed, the processor 150 may change the test image from the second test image to the third test image. However, the disclosure is not limited thereto, and the number of times the button is pressed, which is set for the button for outputting the command or signal for requesting a change of the test image, may be set variously.

While the first test image is displayed, when the processor 150 receives the command requesting a change of the test image or signal corresponding thereto from the test device 200 for a predetermined time, the processor 150 may output a test image corresponding to a number of times of receiving the command for requesting the test image instead of the second test image. For example, while the first test image is displayed, when the processor 150 receives the command to request a change of the test image twice for a preset time of 0.1 seconds, the processor 150 may change the first test image to the third test image instead of the second test image.

The test device 200 may be implemented as a diagnostic jig device for checking connectivity between a plurality of cabinets.

Figure 9:
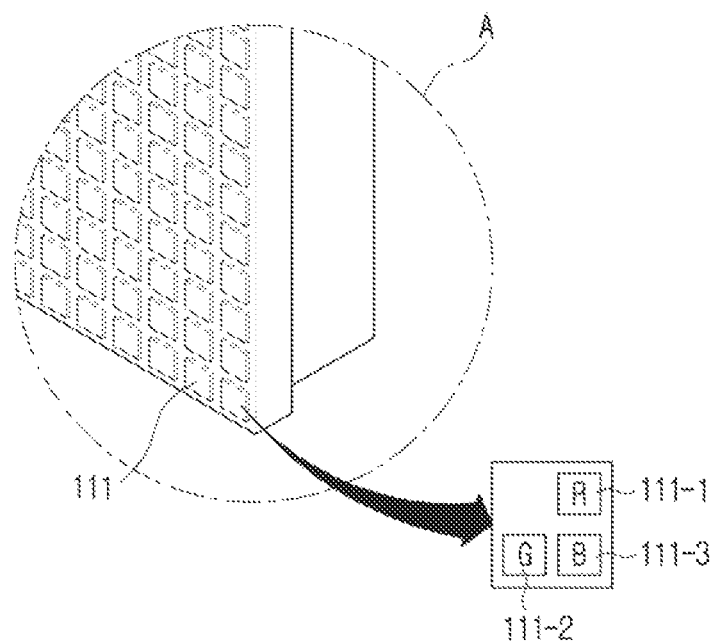
FIG. 9 is an example diagram illustrating a light emitting diode constituting a pixel of a display module included in a cabinet according to an embodiment.

FIG. 9 is an example diagram illustrating a light emitting diode constituting a pixel of a display module included in a cabinet according to an embodiment.

As described above, according to an embodiment of the disclosure, each of the plurality of display modules 110 includes a plurality of light emitting diodes 111 implementing a plurality of pixels. In this case, each of the display modules 110 may further include a plurality of sub-pixels constituting one pixel. More specifically, the display module 110 may include a plurality of sub-pixels constituting one pixel, and in this case, the display module 110 may include a red light emitting diode 111-1, a green light emitting diode 111-2 and a blue light emitting diode 111-3 implementing each sub-pixel. In other words, the display module 110 may include a plurality of red light emitting diodes 111-1, green light emitting diodes 111-2, and blue light emitting diodes 111-3 constituting one pixel as a sub-pixel. In addition, a white light emitting diode may be added to the embodiment of the disclosure. Each display module 110 may include a driving circuit that is connected to the light emitting diode and drives the light emitting diode with a control pulse signal whose size is changed.

The processor 150 of the cabinet 100 may display a test image corresponding to each light emitting diode (a red light emitting diode, a green light emitting diode, and a blue light emitting diode), and identify the connectivity with adjacent cabinets multiple times by transmitting them to the first cabinet 100-1, respectively. For this operation, the plurality of test images stored in the memory 140 of the cabinet 100 may include a white image, a red image, a green image, and a blue image.

According to an embodiment of the disclosure, when it is detected that the test device 200 is connected to the first interface 120, the processor 150 may control the plurality of display modules 110 to display a white image stored in the memory 140. Specifically, the processor 150 may display a white image displayed by driving the red light emitting diode 111-1, the green light emitting diode 111-2, and the blue light emitting diode 111-3 as the first test image and then transmit the white image or related information to the first cabinet 100-1 through the second interface 130. In this case, when the cabinet 100 and the first cabinet 100-1 are normally connected, the same white image displayed on the cabinet 100 may be displayed on the first cabinet 100-1 as well.

According to an embodiment of the disclosure, the processor 150 may control the plurality of display modules 110 to sequentially display a red image and a green image, and a blue image as a command requesting a change of an image displayed on the plurality of display modules 110 receives multiple times.

Specifically, according to an embodiment of the disclosure, the second test image in which the order of which is set to be displayed after the first test image, may be the red image, the third test image in which the order is set to be displayed after the second test image, may be the green image, and a fourth test image in which the order is set to be displayed after the third test image may be the blue image. In this case, the red image may refer to an image in which only the red light emitting diode is driven and displayed among the plurality of light emitting diodes, the green image may refer to an image in which only the green light emitting diode is driven and displayed among the plurality of light emitting diodes, and the blue image may refer to an image in which only the green light emitting diode is driven and displayed among the plurality of light emitting diodes.

While the white image is displayed, when the processor 150 receives a command requesting a change of the test image from the test device 200, the processor 150 may control the plurality of display modules 110 to change the test image displayed through the plurality of display modules 110 from the white image to the red image. While the red image is displayed, when the processor 150 receives a command requesting a change of the test image from the test device 200, the processor 150 may control the plurality of display modules 110 to change the test image displayed through the plurality of display modules 110 from the red image to the blue mage. In other words, after the processor 150 displays a white image that can be output only when all of the red light emitting diode, the green light emitting diode and the blue light emitting diode are driven through the display module, the processor 150 may sequentially display test images for independently driving each light emitting diode. However, the disclosure is not limited thereto, and the order in which the white image, the red image, the blue image, and the green image are displayed and transmitted to the first cabinet may be variously set.

According to an embodiment of the disclosure, the cabinet 100 may display a test image received from the other cabinet instead of at least one test image stored in the memory 140. Hereinafter, an embodiment of the disclosure related thereto will be described in detail with reference to FIGS. 10 to 16.

Figure 10:
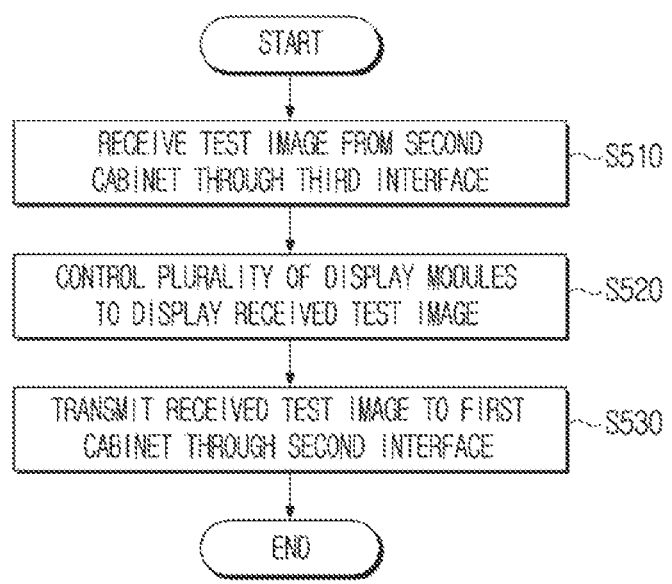
FIG. 10 is a flowchart schematically illustrating a method of controlling a cabinet for identifying connectivity in a first direction between a plurality of cabinets, according to an embodiment.
Figure 11:
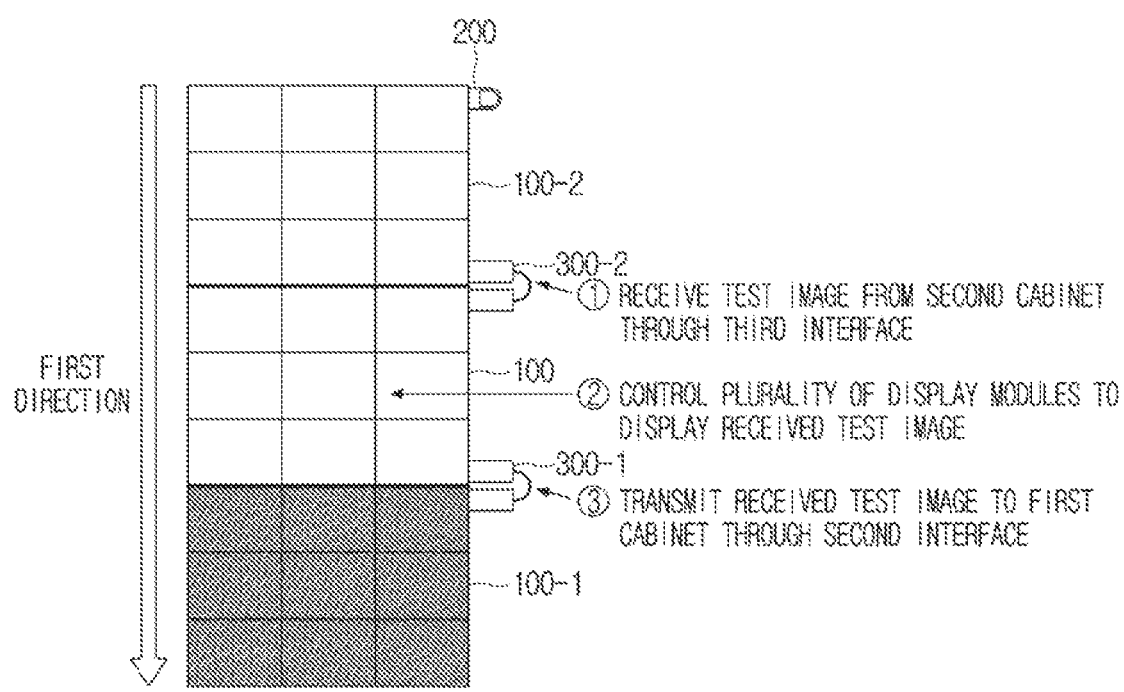
FIG. 11 is an example diagram schematically illustrating a method of identifying connectivity between a cabinet and a first cabinet and connectivity between a cabinet and a second cabinet based on a test image received from the second cabinet, according to an embodiment.

FIG. 10 is a flowchart schematically illustrating a method for controlling a cabinet according to another embodiment. FIG. 11 is an example diagram schematically illustrating a method of identifying connectivity between a cabinet and a first cabinet and connectivity between a cabinet and a second cabinet based on a test image received from the second cabinet, according to an embodiment.

According to an embodiment of the disclosure, the cabinet 100 may further include a third interface 160 connected to a second cabinet adjacent to the cabinet.

In this case, the processor 150 of the cabinet 100 may be connected to the other adjacent cabinet through the third interface 160. In this case, according to an embodiment of the disclosure, the cabinet 100 may be connected to a second cabinet 100-2 different from the first cabinet 100-1 through the third interface 160. The processor 150 may transmit/receive various information (e.g., image information, coordinate information, ID information, etc.) with the second cabinet 100-2 connected through a cable connected to the third interface 160, etc.

The third interface 160 may be implemented, with the first interface 120 and the second interface 130, by being separated as at least one pin corresponding to each interface (the first interface and the third interface) within one interface including a plurality of pins. In this regard, this has been described above, such that a detailed description will be omitted.

In the disclosure, the second cabinet 100-2 refers to the other cabinet arranged adjacent to the cabinet 100 and the cabinet connected through the third interface. More specifically, the second cabinet 100-2 may be the other cabinet arranged in the second direction with respect to the cabinet 100 and connected to the cabinet 100 by a cable or the like through the third interface 160. In this case, the second cabinet 100-2 may be distinguished from the first cabinet 100-1 arranged in the first direction with respect to the cabinet 100.

In the disclosure, the second direction refers to one direction in which image information is transmitted between the plurality of cabinets. Referring back to FIG. 3, when the cabinet 100-E arranged on the lower side of the three cabinets receives image information from an external device, assuming that the received image information is transmitted to the cabinet 100-F arranged in the center, and the cabinet 100-F arranged in the center transmits image information received from the cabinet 100-E arranged on the lower side to the cabinet 100-G arranged on the upper side, the second direction corresponds to a (+) direction of an y-axis. In this case, the second cabinet 100-G is a cabinet arranged on the upper side with respect to the cabinet 100-F arranged in the center. In other words, according to an embodiment of the disclosure, the second direction may be set to be opposite to the first direction.

In order to implement the modular display apparatus 1000, assuming that the plurality of cabinets 100 are sequentially included in the modular display apparatus 1000 and then combined with the cabinets included in the previous order, the second cabinet 100-2 may refer to a cabinet of a next order of the cabinet 100. For example, referring back to FIG. 3, it is assumed that three cabinets 100-E, 100-F, and 100-G are sequentially combined to implement the modular display apparatus 1000. In this case, assuming that the cabinet 100-E arranged on the lower side is arranged, the cabinet 100-F arranged in the center is arranged and combined with the cabinet 100-E arranged on the lower side, and then the cabinet 100-G arranged on the upper side is arranged and combined with the cabinet 100-F arranged in the center, with respect to the cabinet arranged in the center (second cabinet) 100-F, the second cabinet 100-2 may be the cabinet (third cabinet) 100-G disposed in the upper side of the modular display apparatus 1000 in the next order.

Similar to the first cabinet, the second cabinet may be relatively determined with respect to each cabinet constituting the modular display apparatus 1000. Referring back to the above example, the second cabinet 100-2 with respect to the cabinet 100-F arranged in the center is a cabinet arranged in the +y axis, that is the second direction, and connected to the cabinet 100-F arranged in the center. In other words, the second cabinet 100-2 with respect to the cabinet 100-F arranged in the center is the cabinet 100-G arranged on the upper side. The second cabinet 100-2 with respect to the cabinet 100-E arranged on the lower side is a cabinet arranged in the +y axis, that is the second direction, and connected to the cabinet 100-E arranged on the lower side. Accordingly, the second cabinet 100-2 of the cabinet 100-E arranged on the lower side may be the cabinet 100-F arranged in the center. As such, the second cabinet may be relatively determined with respect to each cabinet 100 constituting the modular display apparatus 1000.

Referring to FIG. 10, according to an embodiment of the disclosure, the processor 150 may receive a test image from the second cabinet 100-2 through the third interface (S510). Specifically, referring to FIG. 11, the processor 150 of the centrally positioned cabinet 100 may receive test image information from the second cabinet 100-2 through the cable 300-2 connected to the third interface. The test image received by the processor 150 from the second cabinet 100-2 may be transmitted from the second cabinet 100-2 through the third interface after the corresponding test image is displayed on the second cabinet.

The processor 150 may receive the test image from the second cabinet 100-2 as the cabinet 100 and the second cabinet 100-2 are normally connected through the third interface.

Referring to FIG. 10, after receiving the test image from the second cabinet 100-2, the processor 150 may control the plurality of display modules 110 included in the cabinet 100 to display the received test image (S520).

Referring to FIG. 11, the processor 150 of the centrally positioned cabinet 100 may receive a test image from the second cabinet 100-2 positioned above the cabinet through the third interface. In addition, the processor 150 may control the plurality of display modules 110 included in the cabinet 100 to display the test image received from the second cabinet 100-2. As such, the user may identify the connectivity between the cabinet 100 and the second cabinet 100-2 positioned above the cabinet 100 based on whether the test image of the cabinet 100 is displayed.

The processor 150 may display (S520) the test image received from the second cabinet 100-2, and then transmit the test image received from the second cabinet 100-2 to the first cabinet 100-1 through the second interface 130 (S530).

Referring back to FIG. 11, the processor 150 of the centrally positioned cabinet 100 may display the test image received from the second cabinet 100-2 positioned above the cabinet, and then transmit the image to the first cabinet 100-1 positioned in the lower part of the cabinet 100 through the cable 300-1 connected to the second interface 130. When the cabinet and the first cabinet are normally connected, the test image received by the cabinet 100 from the second cabinet 100-2 may be effectively transmitted to the first cabinet. Also, the first cabinet 100-1 may display the received test image. As such, the user may identify the connectivity between the cabinet 100 and the first cabinet 100-1 positioned below the cabinet 100, and ultimately, the user may check the connection between the second cabinet 100-2 and the cabinet 100 and then check the connection between the cabinet 100 and the first cabinet 100-1 to identify the connectivity of the three cabinets in the first direction.

According to an embodiment of the disclosure, while the processor 150 of the cabinet 100 displays a test image (test image B) received from the second cabinet through the third interface, when the other test image (test image C) is received from the second cabinet 2 through the third interface, the test image displayed by the display module may be changed from the test image B to the test image C. In this regard, a method in which the first cabinet receiving the second test image from the cabinet 100 changes the test image from the first test image to the second test image may be applied to the cabinet, and a detailed description thereof will be omitted.

According to an embodiment of the disclosure, the test image received by the processor 150 of the cabinet 100 from the second cabinet 100-2 may be transmitted from the second cabinet as the test device 200 is separated from the cabinet 100 and connected to the second cabinet, More specifically, immediately after the processor 150 of the cabinet 100 displays at least one test image stored in the memory 140, the test image received from the second cabinet 100-2 may be transmitted from the second cabinet 100-2 as it is connected to the second cabinet after being separated from the cabinet 100. As described above, the processor 150 may display or change an image through the display module 110 when a connection between the cabinet 100 and the test device 200 is detected through the first interface 120 or a command for requesting a change of the test image being displayed is received from the test device 200 through the first interface 120. However, according to an embodiment of the disclosure, the processor 150 of the cabinet 100 may display the test image received through the plurality of display modules 110 when the test image (or information about the test image) is received from the second cabinet 100-2 without detecting the connection of the test device 200 or receiving a control command from the test device 200. In this case, the second cabinet 100-2 may transmit test information to the cabinet based on a test device connected to the second cabinet after being separated from the cabinet 100.

Figure 12:
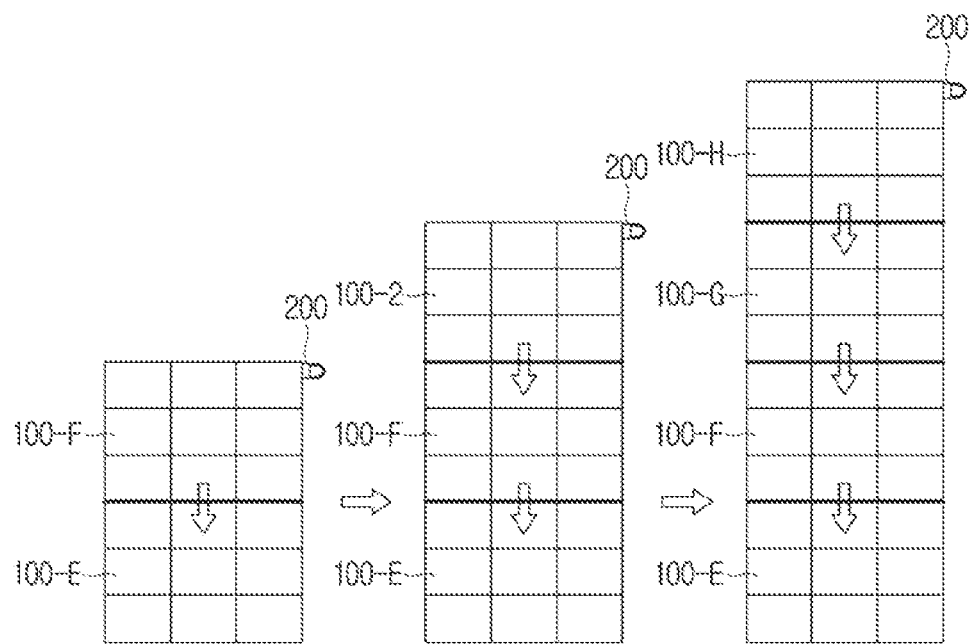
FIG. 12 is a view illustrating a method of identifying connectivity in a first direction of a plurality of cabinets constituting a modular display, according to an embodiment.

FIG. 12 is a view illustrating a method of identifying connectivity of a plurality of cabinets constituting a modular display, according to an embodiment.

Referring to FIG. 12, when the processor of the cabinet F 100-F detects a connection between the cabinet F 100-F and the test device 200 through the first interface, the processor may display at least one test information stored in the memory included in the cabinet F and transmit the displayed at least one test information to the cabinet E 100-E corresponding to the first cabinet positioned in a first direction with respect to cabinet F 100-F through the second interface of the vignette F 100-F.

Thereafter, the cabinet G 100-G positioned in a second direction with respect to the cabinet F 100-F is connected to the cabinet F 100-F through a third interface of the cabinet F 100-F, and the test device is disconnected from cabinet F 100-F and connected to cabinet G 100-G through the first interface of cabinet G 100-G, the processor of cabinet F 100-F may receive at least one test image from the cabinet G 100-G through the third interface of the cabinet F 100-F. The received test image may be the test image stored in the memory of the cabinet G 100-G. Also, after the processor of cabinet F 100-F displays the test image of cabinet G 100-G, the test image of cabinet G 100-G, received from the cabinet G 100-G, may be transmitted to the cabinet E 100-E through the second interface of the cabinet F 100-F.

Thereafter, the cabinet H 100-H positioned in a second direction with respect to the cabinet G 100-G is connected to the cabinet F 100-F through a third interface of the cabinet G 100-G, and the test device is disconnected from cabinet G 100-G and connected to cabinet H 100-H through the first interface of cabinet H 100-H, the processor of cabinet G 100-G may receive at least one test image from the cabinet H 100-H through the third interface of the cabinet F 100-F. The received test image may be the test image stored in the memory of the cabinet H 100-H. Also, after the processor of cabinet G 100-G displays the test image of cabinet H 100-H, the test image of cabinet H 100-H, received from the cabinet H 100-H, may be transmitted to the cabinet F 100-F through the second interface of the cabinet G 100-G. Also, the processor of cabinet F 100-F that has received the test image of cabinet H from cabinet G 100-G through the third interface of cabinet F 100-F may display the received test image of the cabinet H and then transmit the test image of cabinet H to cabinet E 100-E through the second interface of cabinet F 100-F.

As such, whenever cabinets are sequentially combined or connected to implement a modular display apparatus, the user may identify connectivity between adjacent cabinets among a plurality of cabinets by checking whether a plurality of cabinets are displayed or transmitted/received for a test image of a cabinet connected to the test device.

Figure 13A:
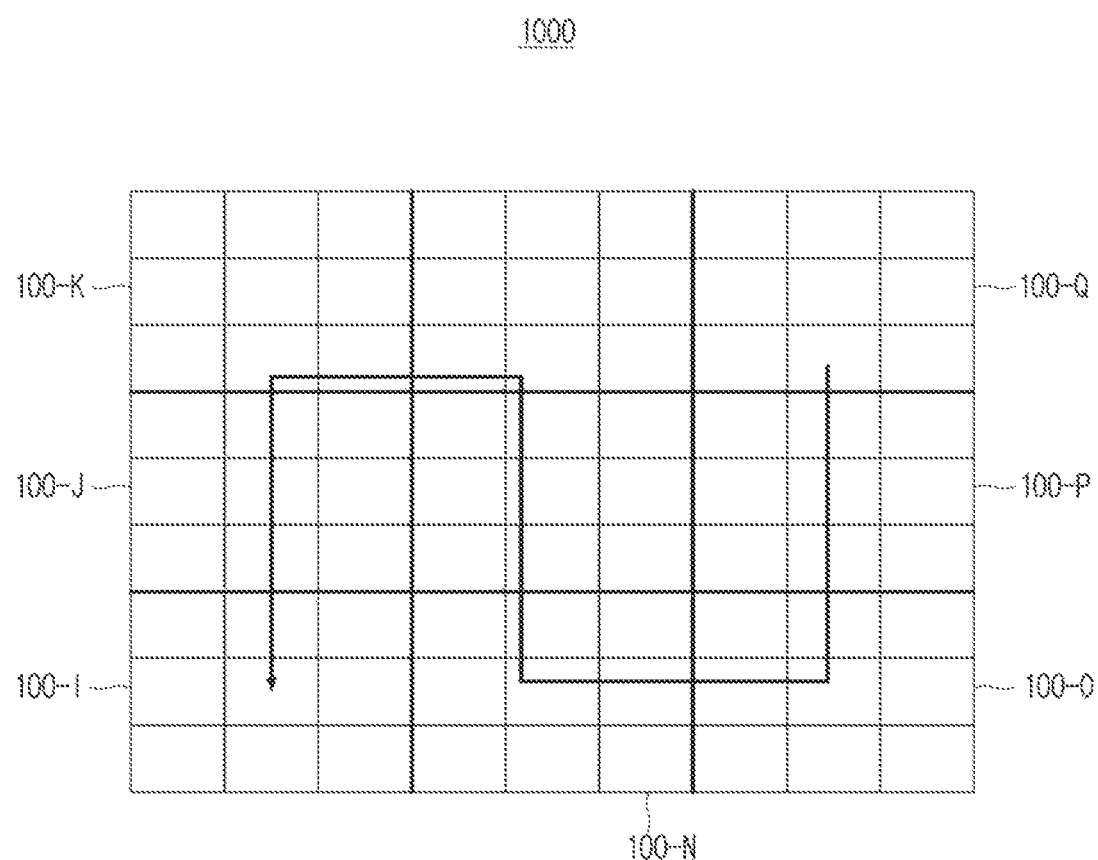
FIGS. 13A and 13B are views illustrating a method of identifying connectivity in a first direction of a plurality of cabinets implementing a modular display, according to an embodiment.
Figure 13B:
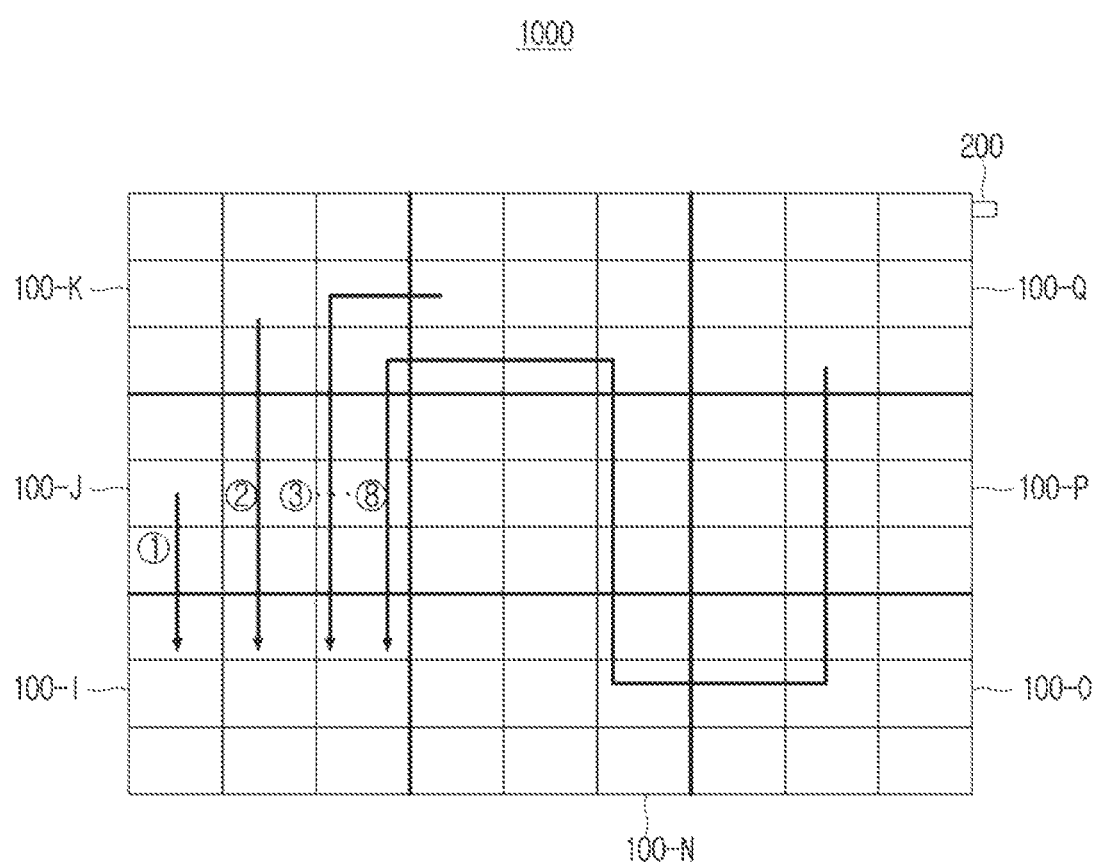

FIGS. 13A and 13B are views illustrating a method of identifying connectivity in a first direction of a plurality of cabinets implementing a modular display, according to an embodiment.

Referring to FIG. 13A, according to an embodiment of the disclosure, a first direction in which image information is transmitted/received may be set as an arrow. Specifically, when a cabinet Q 100-Q positioned at an upper right among the plurality of cabinets receives image information from an external device (e.g., a screen controller), the image information received from the external device may be transmitted to a cabinet P 100-P positioned at a lower side of the cabinet Q 100-Q. The cabinet P 100-P may transmit the image information received from the cabinet Q 100-Q to the cabinet O 100-0 on the lower side of the cabinet P 100-P. And the cabinet O 100-0 may transmit the image information received from the cabinet P 100-P to the cabinet L 100-L on a left side of the cabinet O 100-0. According to the method, the cabinet I 100-I may finally receive image information received by cabinet Q 100-Q from an external device from cabinet J 100-J.

Referring to FIG. 13B, the cabinet J 100-J may be connected to the cabinet I 100-I through a second interface of the cabinet J 100-J, and when it is connected to the test device 200 through a first interface of the cabinet J 100-J, the test image stored in the memory of the cabinet J 100-J may be output, and the corresponding test image may be transmitted to the cabinet I 100-I through a second interface of the cabinet J 100-J. Thereafter, when cabinet K 100-K on an upper side of cabinet J 100-J is connected through a third interface of cabinet J 100-J and a second interface of cabinet K 100-K, and when the test device is disconnected from cabinet J 100-J and connected to cabinet K 100-K through the first interface of cabinet K 100-K, cabinet K 100-K may display the test image stored in the memory the cabinet K 100-K. And the cabinet K 100-K may transmit the displayed test image to the cabinet J 100-J through the second interface of the cabinet K 100-K. Thereafter, cabinet J 100-J may display the received test image of cabinet K 100-K, and then transmit the test image of cabinet K 100-K to cabinet I 100-I through a second interface of cabinet J 100-J. This process will be repeated as a cabinet is newly included in the modular display apparatus and is connected to an adjacent cabinet. Referring to FIG. 13B, assuming that a command requesting a change of a test image is not transmitted from the test device, the cabinet J 100-J may perform a process of transmitting the test image to cabinet I 100-I eight times in order to detect connectivity of nine cabinets implementing the modular display apparatus 1000 in a first direction. In other words, in the process of combining or connecting cabinets to implement a modular display apparatus, the user may verify not only connectivity between a newly added cabinet and a previously installed cabinet, but also previously installed and connected cabinets, only with the connection between the test device and the newly added cabinet.

Figure 14:
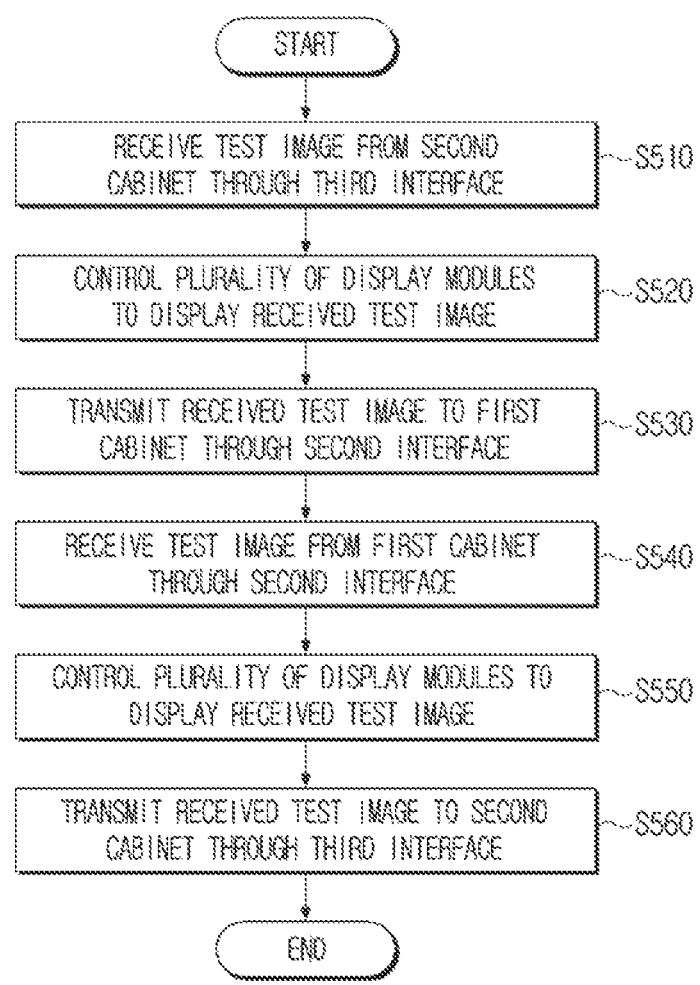
FIG. 14 is a flowchart schematically illustrating a method of controlling a cabinet for identifying connectivity in a second direction between a plurality of cabinets, according to an embodiment.
Figure 15:
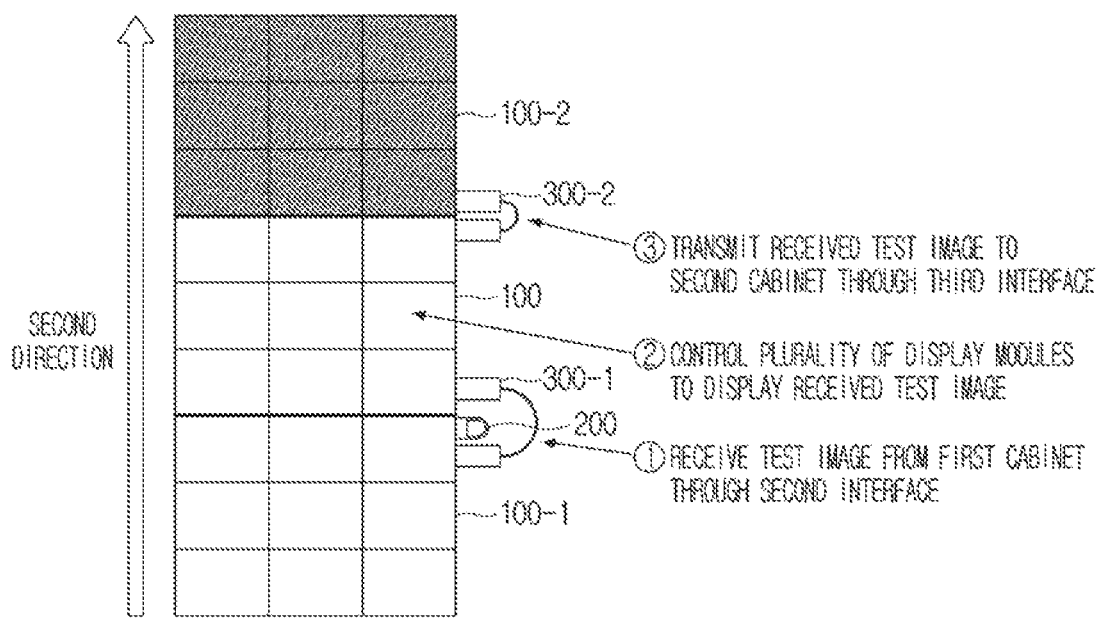
FIG. 15 is a flowchart illustrating a method of controlling a cabinet for identifying connectivity in a second direction between a plurality of cabinets, according to an embodiment.
Figure 16:
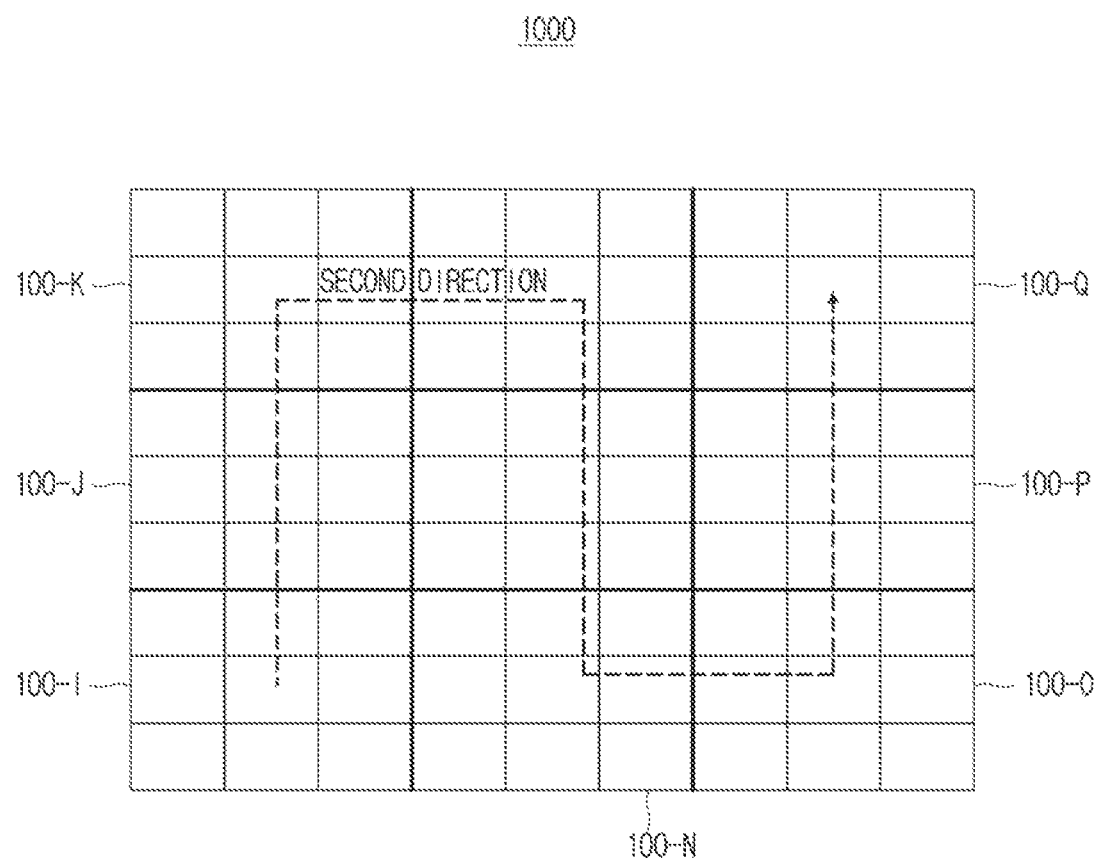
FIG. 16 is a view illustrating a method of identifying connectivity in a second direction of a plurality of cabinets implementing a modular display, according to an embodiment.

FIG. 14 is a flowchart schematically illustrating a method of controlling a cabinet for identifying connectivity in a second direction between a plurality of cabinets, according to an embodiment. FIG. 15 is a flowchart illustrating a method of controlling a cabinet for identifying connectivity in a second direction between a plurality of cabinets, according to an embodiment. FIG. 16 is a view illustrating a method of identifying connectivity in a second direction of a plurality of cabinets implementing a modular display, according to an embodiment.

When connectivity in the first direction is checked, the processor 150 may check connectivity in a second direction between the cabinet and the other cabinet. For this operation, the processor 150 may receive a test image (or a signal related to the test image) from the first cabinet 100-1 that has transmitted the test image (or a signal related to the test image) through the second interface. Also, the processor 150 may transmit, to the second cabinet 100-2, the test image (or a signal related to the test image) received from the first cabinet 100-1 that has received the test image (or a signal related to the test image) through the third interface. Hereinafter, an embodiment of the disclosure checking connectivity in a second direction opposite to a first direction between a plurality of cabinets will be described.

Referring to FIG. 14, the processor 150 of the cabinet 100 may receive a test image from the first cabinet 100-1 through the second interface 130 (S540).

Specifically, the processor 150 may receive the test image information from the first cabinet 100-1 through the cable 300-1 connected to the second interface 130 of the cabinet 100. The test image received by the processor 150 from the first cabinet 100-1 may be transmitted, to the cabinet 100, from the first cabinet 100-1 through the second interface after the corresponding test image is displayed on the first cabinet 100-1.

The processor 150 may receive the test image from the first cabinet 100-1 as the cabinet 100 and the first cabinet 100-1 are normally connected through the second interface 130.

Referring back to FIG. 14, the processor 150 may control the plurality of display modules 110 to display the test image received from the first cabinet 100-1 (S550).

Referring back to FIG. 15, the processor 150 of the centrally positioned cabinet 100 may receive the test image from the first cabinet 100-1 positioned lower side of the cabinet through the second interface, and then the processor 150 may control the plurality of display modules 110 included in the cabinet 100 to display the test image received from the first cabinet 100-1. The user may identify connectivity between the cabinet and the first cabinet positioned lower side of the cabinet based on whether the test image of the cabinet 100 is displayed.

Referring back to FIG. 14, the processor 150 may transmit the test image received from the first cabinet 100-1 to the second cabinet 100-2 through the third interface (S570). According to an embodiment of the disclosure, the test image received from the first cabinet 100-1 may be displayed on the first cabinet that has received the test image through the third interface.

Referring back to FIG. 15, the processor 150 of the cabinet 100 positioned in the center may display the test image received from the first cabinet 100-1 positioned lower side of the cabinet, and then transmit the corresponding image to the second cabinet 100-2 positioned upper side of the cabinet 100 through the cable 300-2 connected to the third interface. When the cabinet 100 and the second cabinet 100-2 are normally connected, the test image received by the cabinet 100 from the first cabinet 100-1 may be effectively transmitted to the second cabinet. In addition, the second cabinet 100-2 may display the received test image. As such, the user may identify the connectivity between the cabinet 100 and the second cabinet 100-2 positioned lower side of the cabinet 100, and the user may check the connection between the first cabinet 100-1 and the cabinet 100 and then check the connection between the cabinet 100 and the second cabinet to identify the connectivity of the three cabinets in the second direction.

According to an embodiment of the disclosure, when the processor 150 receives the test image from the first cabinet 100-1, it may be transmitted from the first cabinet 100-1 as the test device 200 connected to the cabinet 100 is separated and connected to the first cabinet 100-1. In this regard, this has been described above, such that a detailed description will be omitted.

Referring to FIG. 16, according to an embodiment of the disclosure, the processor 150 of the cabinet may perform a process of identifying the connectivity with respect to the second direction once, unlike the process of identifying the connectivity with respect to the first direction over a plurality of times. Specifically, if it is identified that the connection in the first direction between the plurality of cabinets 100 implementing the modular display apparatus 1000 is normally performed based on the identification of the connectivity with respect to the first direction, the test device 200 may be connected to a cabinet that has no connection history among cabinets. Suitably, when a plurality of cabinets are sequentially combined to implement the modular display apparatus 1000, a first cabinet (fifth cabinet) may correspond thereto. Referring to FIG. 16, cabinet I 100-I corresponds to a cabinet connected to the test device to identify connectivity with respect to the second direction. When the test device 200 is connected to the first interface of the cabinet I 100-I, the cabinet I 100-I may output at least one test image stored in the memory of the cabinet I 100-I, and then transmit the test image to cabinet J 100-J positioned on an upper side of cabinet I 100-I, which is a second display module for cabinet I 100-I, through the third interface of cabinet I 100-I. When the plurality of display modules are normally connected in the second direction, the test image of cabinet I 100-I may be finally transmitted to cabinet Q 100-Q and displayed on cabinet Q 100-Q. The user may identify whether the connection with the respect to the first direction and the second direction between the plurality of cabinets implementing the modular display apparatus is normally performed.

Figure 17:
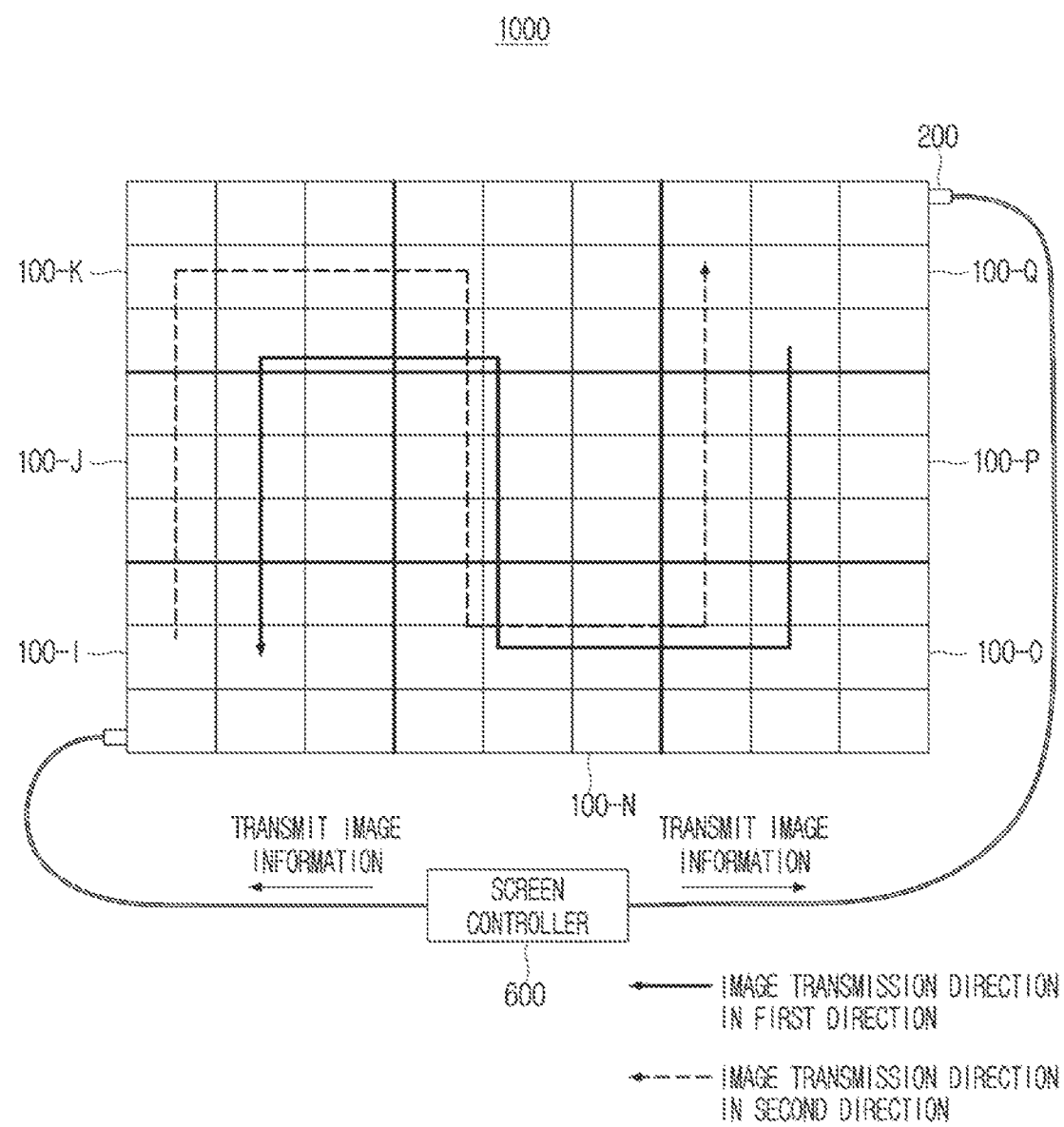
FIG. 17 is an example diagram schematically illustrating that a modular display apparatus implemented with a plurality of cabinets outputs an image, according to an embodiment.

FIG. 17 is an example diagram schematically illustrating that a modular display apparatus implemented with a plurality of cabinets outputs an image, according to an embodiment.

As described above, the modular display apparatus 1000 may receive image information from the screen controller 600. Specifically, when at least one cabinet among a plurality of cabinets implementing the modular display apparatus 1000 receives image information from the screen controller, the at least one cabinet that has received the image information may transmit the received image information to the other adjacent cabinet. As such, since the cabinet receiving the image information transmits the image information to the other adjacent cabinet, all cabinets constituting the modular display apparatus 1000 may share the image information. Referring to FIG. 17, the modular display apparatus 1000 may receive image information in both directions from the screen controller 600. Specifically, when the cabinet Q 100-Q among the plurality of cabinets receives image information from the screen controller 600, the plurality of cabinets may transmit and receive image information in the first direction. When cabinet I 100-I among the plurality of cabinets receives image information from the screen controller 600, the plurality of cabinets may transmit and receive image information in the second direction. The modular display apparatus 1000 may selectively select a transmission/reception path of image information, and may preliminarily operate the transmission/reception path of image information. Specifically, when it is impossible to transmit/receive image information in the first direction since connectivity with respect to the first direction is damaged, the image information may be transmitted/received based on the remaining path, that is, connectivity with respect to the second direction.

The screen controller 600 may not only transmit image information to the modular display apparatus 1000, but also control each cabinet constituting the modular display apparatus 1000 and luminance and volume of a plurality of display modules included in each cabinet.

Although the screen controller 600 is illustrated as a separate device from the modular display apparatus 1000 in FIG. 17, the disclosure is not limited thereto, and the screen controller 600 may be implemented as a central processing unit (CPU) of the modular display apparatus 1000, micro controller unit (MCU), or the like.

Figure 18:
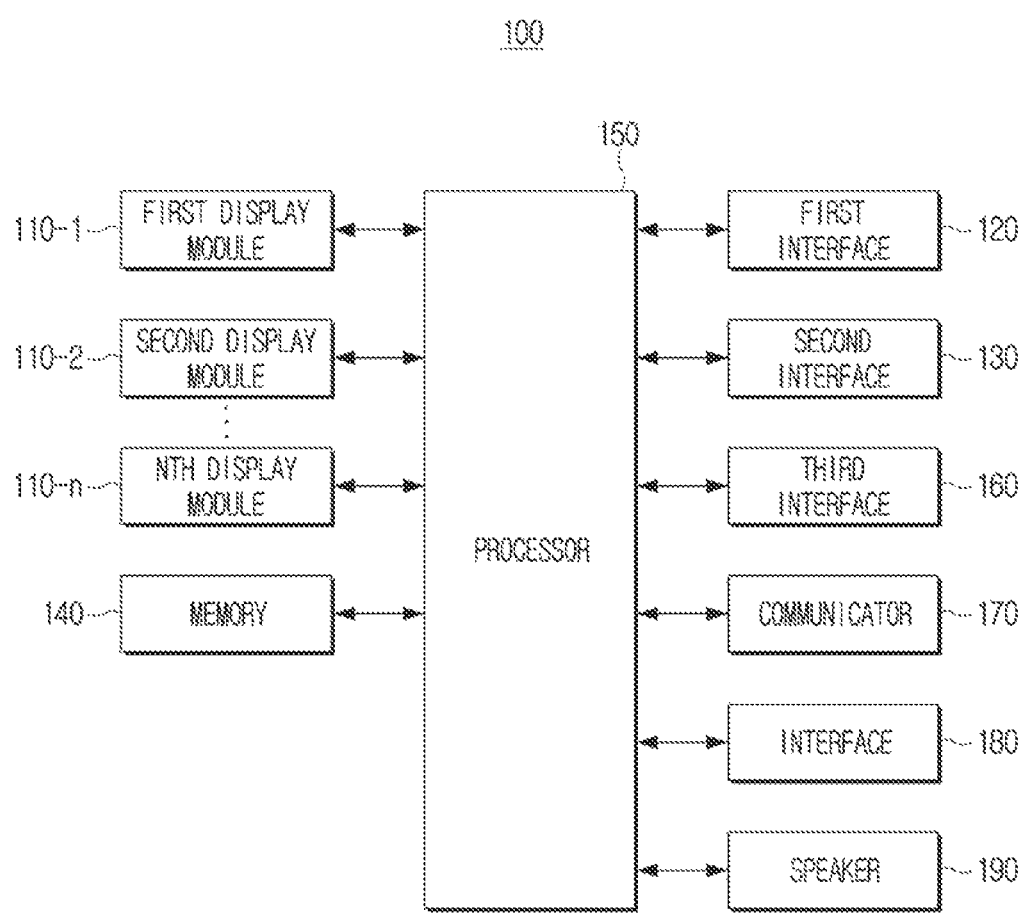
FIG. 18 is a detailed block diagram of a cabinet according to an embodiment.

FIG. 18 is a detailed block diagram of a cabinet according to an embodiment.

Referring to FIG. 18, the cabinet may include a plurality of display modules 110, a first interface 120, a second interface 130, a memory 140, a processor 150, a third interface 160, and a communicator 170, an interface 180, and a speaker 190. Detailed descriptions of the plurality of display modules 110, the first interface 120, the second interface 130, the memory 140, the processor 150, and the third interface 160 have been described above, and thus they will be omitted.

The cabinet 100 may transmit/receive various information by performing communication with various external devices using a wireless communication technology or a mobile communication technology through the communicator 170. For example, the cabinet 100 may transmit and receive image information from an external device or the screen controller 600 through the communicator 170. In this case, the processor 150 may adjust a resolution of the received image information based on the number of the plurality of display modules included in the cabinet 100 and an arrangement shape of the plurality of display modules, or identify a part of an image corresponding to the arrangement position on the display apparatus. A wireless communication technology may include, for example, Bluetooth, Bluetooth low energy, CAN communication, Wi-Fi, Wi-Fi Direct, ultrawideband Communication (UWB), Zigbee, infrared data association (IrDA), or near field communication (NFC), and a mobile communication technology may include 3GPP, Wi-Max, long term evolution (LTE), 5G, or the like.

The cabinet 100 may receive a control command or the like from the other device provided separately from the cabinet 100 through the input interface 180. For this operation, the input interface 180 may be provided to be connectable to an external device. For example, input/output interface 183 may be a universal serial bus (USB) terminal, and include at least one of various interface terminals such as a high-definition multimedia interface (HDMI) terminal, a thunderbolt terminal, or the like.

The cabinet 100 may further include the speaker 190 as an element for outputting various kinds of externally received audio information or various notification sounds or voice messages. The cabinet 100 may provide a response result and an operation result to the user's voice in a form of a voice through the speaker 190.

Various example embodiments described above may be embodied in a recording medium that may be read by a computer or a similar apparatus to the computer using software, hardware, or a combination thereof. In some cases, the embodiments described herein may be implemented by the processor 150 itself. In a software configuration, various embodiments described in the specification such as a procedure and a function may be embodied as separate software modules. The software modules may respectively perform one or more functions and operations described in the disclosure.

According to various embodiments described above, computer instructions for performing processing operations of the display module 110 according to the various embodiments described above may be stored in a non-transitory computer-readable medium. The computer instructions stored in the non-transitory computer-readable medium may cause a particular device to perform processing operations on the display module 110 according to the various embodiments described above when executed by the processor of the particular device.

The non-transitory computer readable recording medium may refer, for example, to a medium that stores data and that can be read by devices. For example, the non-transitory computer-readable medium may include, for example, and without limitation, a CD, DVD, a hard disc, Blu-ray disc, USB, a memory card, ROM, or the like.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. A cabinet of a modular display apparatus, the cabinet comprising:
   a plurality of display modules;
   a first interface;

a second interface configured to be connected to a first cabinet adjacent to the cabinet;

a memory configured to store at least one test image; and a processor configured to, based on a detection that a test device is connected to the first interface, obtain the at least one test image stored in the memory, control the plurality of display modules to display the at least one test image, and control the second interface to transmit the at least one test image to the first cabinet to be displayed on the first cabinet.

2. The cabinet of claim 1, wherein the processor is further configured to:

based on the detection that the test device is connected to the first interface, control the plurality of display modules to display a first test image among a plurality of test images stored in the memory, and based on receiving, while the first test image is displayed by the plurality of display modules, a command to change an image displayed on the plurality of display modules from the test device, control the plurality of display modules to display a second test image among the plurality of test images, and control the second interface to transmit the second test image to the first cabinet to be displayed on the first cabinet.

3. The cabinet of claim 2, wherein the command is received from the test device based on a button provided on the test device being pressed.

4. The cabinet of claim 2, wherein each of the plurality of display modules comprises a plurality of light emitting diodes constituting a plurality of pixels, wherein the plurality of light emitting diodes comprises a red light emitting diode, a green light emitting diode, and a blue light emitting diode, wherein the plurality of test images comprises a white image, a red image, a green image, and a blue image, and wherein the processor is further configured to:

based on the detection that the test device is connected to the first interface, control the plurality of display modules to display the white image, and based on the command to change the image displayed on the plurality of display modules being received a plurality of times from the test device, control the plurality of display modules to sequentially display the red image, the green image, and the blue image.

5. The cabinet of claim 1, wherein the cabinet further comprises a third interface connected to a second cabinet adjacent to the cabinet, and wherein the processor is further configured to, based on receiving the at least one test image from the second cabinet through the third interface, display the received at least one test image, and control the second interface to transmit the received at least one test image to the first cabinet.

6. The cabinet of claim 5, wherein the received at least one test image is configured to be received from the second cabinet based on the test device being disconnected from the cabinet and connected to the second cabinet.

7. The cabinet of claim 5, wherein the processor is further configured to, based on receiving the at least one test image from the first cabinet through the second interface, control the plurality of display modules to display the received at least one test image, and control the third interface to transmit the received at least one test image to the second cabinet to be displayed on the first cabinet.

8. The cabinet of claim 1, wherein the processor is further configured to control the second interface to transmit the at least one test image to the first cabinet through the second interface further based on the first cabinet being normally connected to the second interface.

9. The cabinet of claim 1, wherein the processor is further configured to, based on the detection that the test device is connected to the first interface, receive a test image output signal from the test device and extract the at least one test image stored in the memory based on the received test image output signal.

10. A method for controlling a cabinet of a modular display apparatus, the method comprising:

detecting that a test device is connected to a first interface of the cabinet;

based on detecting that the test device is connected to the first interface, obtaining at least one test image stored in a memory of the cabinet;

controlling a plurality of display modules of the cabinet to display the at least one test; and transmitting, through a second interface of the cabinet, the at least one test image to a first cabinet to be displayed on the first cabinet.

11. The method of claim 10, further comprising:

based on the detecting that the test device is connected to the first interface, controlling the plurality of display modules to display a first test image among a plurality of test images stored in the memory;

while the first test image is displayed, receiving a command to change an image displayed on the plurality of display modules from the test device;

based on receiving the command, controlling the plurality of display modules to display a second test image among the plurality of test images; and transmitting, through the second interface, the second test image to the first cabinet to be displayed on the first cabinet.

12. The method of claim 11, wherein the command is received from the test device based on a button provided on the test device being pressed.

13. The method of claim 11, further comprising:

wherein each of the plurality of display modules comprises a plurality of light emitting diodes constituting a plurality of pixels, wherein the plurality of light emitting diodes comprises a red light emitting diode, a green light emitting diode, and a blue light emitting diode, wherein the plurality of test images stored in the memory comprises a white image, a red image, a green image, and a blue image, based on the detecting that the test device is connected to the first interface, controlling the plurality of display modules to display the white image; and based on the command to change of the image displayed on the plurality of display modules being received a plurality of times from the test device, controlling the plurality of display modules to sequentially display the red image, the green image, and the blue image.

14. The method of claim 10, further comprising:

receiving, through a third interface of the cabinet, the at least one test image from a second cabinet adjacent to the cabinet;

controlling the plurality of display modules to display the received at least one test image; and transmitting the received at least one test image to the first cabinet through the second interface.

15. The method of claim 14, wherein the received at least one test image is received from the second cabinet based on the test device being disconnected from the cabinet and connected to the second cabinet.

16. The method of claim 14, further comprising:
- receiving the at least one test image from the first cabinet through the second interface;
- controlling the plurality of display modules to display the received at least one test image; and
- transmitting, through the third interface, the received at least one test image to the second cabinet, to be displayed on the first cabinet.

17. The method of claim 14, wherein the transmitting the at least one test image comprises transmitting the at least one test image to the first cabinet through the second interface based on the first cabinet being normally connected to the second interface.

18. The method of claim 10, further comprising, based on the detection that the test device is connected to the first interface, receiving a test image output signal from the test device, wherein the obtaining the at least one test image comprises extracting the at least one test image stored in the memory based on the received test image output signal.

\* \* \* \* \*